United States Patent
Yamaguchi

(10) Patent No.: US 8,289,410 B2
(45) Date of Patent: Oct. 16, 2012

(54) RECORDING APPARATUS AND METHOD, PLAYBACK APPARATUS AND METHOD, AND PROGRAM

(75) Inventor: Tadashi Yamaguchi, Saitama (JP)

(73) Assignee: Sony Corporation, Tokyo (JP)

(*) Notice: Subject to any disclaimer, the term of this patent is extended or adjusted under 35 U.S.C. 154(b) by 519 days.

(21) Appl. No.: 12/488,091

(22) Filed: Jun. 19, 2009

(65) Prior Publication Data

US 2010/0020188 A1  Jan. 28, 2010

(30) Foreign Application Priority Data

Jul. 28, 2008 (JP) ................................. 2008-193457

(51) Int. Cl.
*H04N 5/227* (2006.01)
*H04N 5/77* (2006.01)

(52) U.S. Cl. ..................................... 348/220.1; 386/227

(58) Field of Classification Search .................. 348/14.1, 348/220.1, 231.3, 231.5; 386/227
See application file for complete search history.

(56) References Cited

U.S. PATENT DOCUMENTS

| | | | |
|---|---|---|---|
| 6,389,182 B1 | 5/2002 | Ihara et al. | |
| 6,871,010 B1* | 3/2005 | Taguchi et al. | 386/230 |
| 6,995,792 B1* | 2/2006 | Ogura | 348/231.99 |
| 7,145,597 B1* | 12/2006 | Kinjo | 348/222.1 |
| 7,249,257 B2* | 7/2007 | Brundage et al. | 713/176 |
| 2003/0052986 A1* | 3/2003 | Matsumoto | 348/333.05 |
| 2009/0309989 A1* | 12/2009 | Tanaka et al. | 348/220.1 |

FOREIGN PATENT DOCUMENTS

| | | |
|---|---|---|
| JP | 2000-82107 | 3/2000 |
| JP | 2001-216770 | 8/2001 |
| JP | 2002-118811 | 4/2002 |
| JP | 2003-179842 | 6/2003 |
| JP | 2005-4638 | 1/2005 |
| JP | 2005-354412 | 12/2005 |
| JP | 2006-134473 | 5/2006 |
| JP | 2007-228406 | 9/2007 |
| JP | 2008-10979 | 1/2008 |

OTHER PUBLICATIONS

Japanese Office Action issued Oct. 5, 2010, in Patent Application No. 2008-193457.

* cited by examiner

*Primary Examiner* — Trung Diep
(74) *Attorney, Agent, or Firm* — Oblon, Spivak, McClelland, Maier & Neustadt, L.L.P.

(57) ABSTRACT

A recording apparatus includes: a still image acquiring unit configured to acquire a still image from a moving image during recording or playback of the moving image; an information adding unit configured to add information related to the moving image at or slightly before the time the still image is acquired by the still image acquiring means, to the still image acquired by the still image acquiring unit; and a still image recording unit configured to record the still image to which the information related to the moving image has been added by the information adding unit.

10 Claims, 16 Drawing Sheets

RECORDING APPARATUS AND METHOD, PLAYBACK APPARATUS AND METHOD, AND PROGRAM

BACKGROUND OF THE INVENTION

1. Field of the Invention

The present invention relates to a recording apparatus and method, a playback apparatus and method, and a program. More specifically, the present invention relates to a recording apparatus and method, a playback apparatus and method, and a program, which make it possible to easily locate a desired point for playback from a recorded moving image.

2. Description of the Related Art

In recent years, the HDD (Hard Disk Drive) capacity of compact video cameras is increasing, making it possible to shoot high-quality moving images for a long time or shoot a large number of still images.

In addition, video cameras are increasingly equipped with a function with which even during shooting of a moving image, when wishing to save this scene also as a photograph, a still image is also saved by pressing a shutter button while shooting the moving image, or a function with which when, after a moving image is shot, it is desired to save this scene while browsing the moving image at a later date, the scene is saved by pressing a shutter button.

In coming years, it is expected that video cameras will become increasingly smaller in size and larger in capacity, and moving images with longer durations and a greater number of still images will be stored in video cameras.

In this regard, it is necessary to organize and search through moving images with long durations and a large number of still images which have been captured and stored. Examples of search techniques employed in recent years include one which searches for a desired moving image from a video cassette in which moving images and the like are recorded, and one which searches for processing within a personal computer (see Japanese Unexamined Patent Application Publication NO. 2000-82107 and Japanese Unexamined Patent Application Publication NO. 2001-216770).

SUMMARY OF THE INVENTION

Generally, a still image only cuts out a specific instant in time. Thus, even a person who was not present in the location of shoot can browse still images relatively quickly at his/her own pace, has a desired photograph printed on a printer, paste the photograph to an album for easy organization.

However, browsing a moving image takes as much time as shooting the moving image. Also, a moving image contains many unimportant parts. Therefore, it is particularly difficult for a person who was not present in the location of shoot to find which scene is an important part.

Further, no search technique exists in the related art which searches for a desired point from a stored moving image.

It is desired to easily locate a desired point for playback from a stored moving image.

A recording apparatus according to an embodiment of the present invention includes: still image acquiring means for acquiring a still image from a moving image during recording or playback of the moving image; information adding means for adding information related to the moving image at or slightly before the time the still image is acquired by the still image acquiring means, to the still image acquired by the still image acquiring means; and still image recording means for recording the still image to which the information related to the moving image has been added by the information adding means.

The recording apparatus may further include: GPS information acquiring means for acquiring GPS information from a GPS (Global Positioning System); and GPS information adding means for adding the GPS information acquired by the GPS information acquiring means to the moving image, and the information related to the moving image may be the GPS information acquired by the GPS information acquiring means.

The recording apparatus may further include: image capturing means for capturing the information related to the moving image which is printed together with the still image; and moving image playback means for performing playback from the moving image at or slightly before the time the still image is acquired by the still image capturing means, on the basis of the information related to the moving image which has been captured by the image capturing means.

The recording apparatus may further include separator information embedding means for embedding separator information into the moving image at or slightly before the time the still image is acquired by the still image acquiring means, and the moving image playback means may perform playback from the moving image at or slightly before the time the still image is acquired by the still image acquiring means, on the basis of the information related to the moving image which has been captured by the image capturing means and the separator information embedded into the moving image by the separator information embedding means.

The information related to the moving image may be printed as a two-dimensional code, together with the still image.

The information related to the moving image may be printed as a digital watermark, together with the still image.

The recording apparatus may further include moving image playback means for performing playback from the moving image at or slightly before the time the still image is acquired by the still image acquiring means, on the basis of the information related to the moving image, when the still image to which the information related to the moving image has been added by the information adding means is selected.

The recording apparatus may further include separator information embedding means for embedding separator information into the moving image at or slightly before the time the still image is acquired by the still image acquiring means.

The information related to the moving image may be information related to a position of the separator information embedded into the moving image by the separator information embedding means.

A recording method according to an embodiment of the present invention includes the steps of: acquiring a still image from a moving image during recording or playback of the moving image; adding information related to the moving image at or slightly before the time the still image is acquired, to the still image; and recording the still image to which the information related to the moving image has been added.

A program according to an embodiment of the present invention causes a computer to execute processing including the steps of: acquiring a still image from a moving image during recording or playback of the moving image; adding information related to the moving image at or slightly before the time the still image is acquired, to the still image; and recording the still image to which the information related to the moving image has been added.

A playback apparatus according to an embodiment of the present invention includes: image capturing means for capturing information related to a moving image, which is information related to the moving image at or slightly before the time a still image is acquired during recording or playback of the moving image, and which is added and recorded to the still image and is printed together with the still image that is recorded; and moving image playback means for performing playback from the moving image at or slightly before the time the still image is acquired, on the basis of the information related to the moving image which has been captured by the image capturing means.

The information related to the moving image may be GPS (Global Positioning System) information added to the moving image.

In the moving image, separator information may be embedded into the moving image at or slightly before the time the still image is acquired, and the moving image playback means may perform playback from the moving image at or slightly before the time the still image is acquired, on the basis of the information related to the moving image which has been captured by the image capturing means and the separator information embedded into the moving image.

The moving image playback means may perform playback from the moving image at or slightly before the time the still image is acquired, also when the still image to which the information related to the moving image has been added and recorded is selected.

The information related to the moving image may be printed as a two-dimensional code, together with the still image.

The information related to the moving image may be printed as a digital watermark, together with the still image.

In the moving image, separator information may be embedded into the image at or slightly before the time the still image is acquired, and the information related to the moving image may be a separator number.

A playback method according to an embodiment of the present invention includes the steps of: capturing information related to a moving image, which is information related to the moving image at or slightly before the time a still image is acquired during recording or playback of the moving image, and which is added and recorded to the still image and is printed together with the still image that is recorded; and performing playback from the moving image at or slightly before the time the still image is acquired, on the basis of the information related to the moving image which has been captured.

A program according to an embodiment of the present invention causes a computer to execute processing including the steps of: capturing information related to a moving image, which is information related to the moving image at or slightly before the time a still image is acquired during recording or playback of the moving image, and which is added and recorded to the still image and is printed together with the still image that is recorded; and performing playback from the moving image at or slightly before the time the still image is acquired, on the basis of the information related to the moving image which has been captured.

According to an embodiment of the present invention, a still image is acquired from a moving image during recording or playback of the moving image. Then, information related to the moving image at or slightly before the time the still image is acquired is added to the still image, and the still image to which the information related to the moving image has been added is recorded.

According to an embodiment of the present invention, information related to a moving image, which is information related to the moving image at or slightly before the time a still image is acquired during recording or playback of the moving image, and which is added and recorded to the still image and is printed together with the still image that is recorded, is captured. Then, playback is performed from the moving image at or slightly before the time the still image is acquired, on the basis of the information related to the moving image which has been captured.

According to an embodiment of the present invention, a still image can be acquired during recording or playback of a moving image. In addition, according to an embodiment of the present invention, a desired point can be easily located for playback from a recorded moving image.

According to an embodiment of the present invention, a moving image can be played back. In addition, according to an embodiment of the present invention, a desired point can be easily located for playback from a recorded moving image.

DESCRIPTION OF THE PREFERRED EMBODIMENTS

Figure 1:
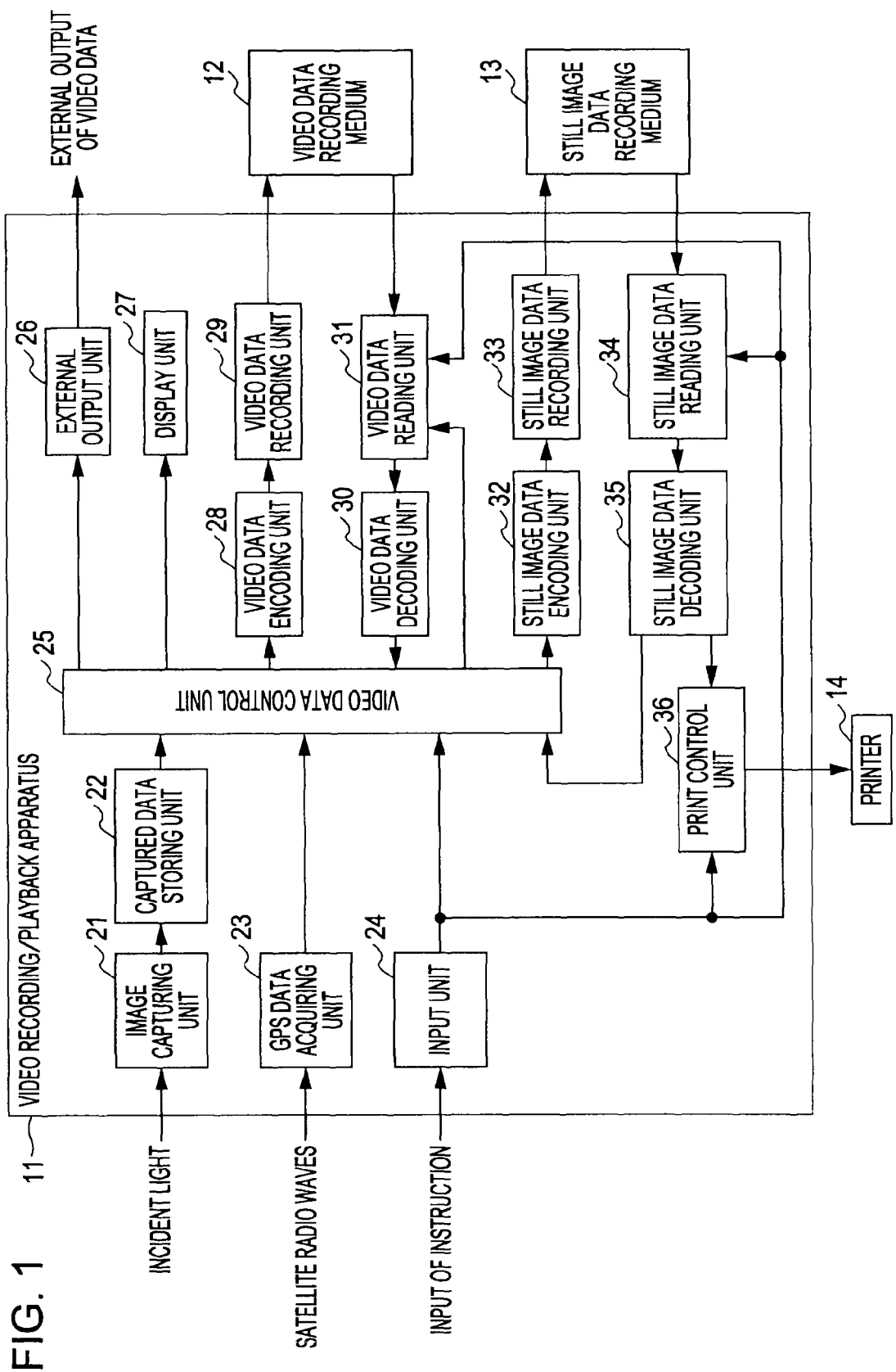
FIG. 1 is a block diagram showing a configuration example of a video recording/playback apparatus according to an embodiment of the present invention.

FIG. 1 is a block diagram showing an example of configuration of a video recording/playback apparatus according to an embodiment of the present invention.

A video recording/playback apparatus 11 shown in FIG. 1 is configured by, for example, a camcorder. A video data recording medium 12, a still image recording medium 13, and the like can be inserted into and removed from the video recording/playback apparatus 11. A printer 14 is connected to the video recording/playback apparatus 11 as necessary.

The video recording/playback apparatus 11 records video data corresponding to a captured video (also referred to as a moving image as appropriate) onto the video data recording medium 12 being inserted, or records still image data acquired from video data onto the still image data recording medium 13 being inserted. Also, the video recording/playback apparatus 11 prints a still image corresponding to the still image data recorded on the still image data recording medium 13, on the connected printer 14.

The video recording/playback apparatus 11 includes an image capturing unit 21, a captured data storing unit 22, a GPS data acquiring unit 23, an input unit 24, a video data control unit 25, an external output unit 26, a display unit 27, a video data encoding unit 28, a video data recording unit 29, a video data decoding unit 30, a video data reading unit 31, a still image data encoding unit 32, a still image data recording unit 33, a still image data reading unit 34, a still image data decoding unit 35, and a print control unit 36.

Incident light is inputted to the image capturing unit 21. The image capturing unit 21 forms an image of a subject in a built-in image capturing device such as a CCD (Charge Coupled Device) or CMOS (Complementary Metal Oxide Semiconductor) sensor, and transfers image data accumulated on the image capturing device to the captured data storing unit 22. The captured data storing unit 22 is configured by, for example, a semiconductor memory, and temporarily stores multiple images' worth (multiple frames' worth) of image data inputted from the image capturing unit 21.

The GPS (Global Positioning System) data acquiring unit 23 receives at an antenna (not shown) satellite radio waves from several satellites located high above the GPS data acquiring unit 23 itself in the sky, among about 30 GPS satellites launched by the United States to acquire the current date and time information and position information (hereinafter, also generically referred to as GPS information). The GPS data acquiring unit 23 transfers the acquired GPS information to the video data control unit 25. It should be noted that the GPS information to be acquired is not limited to date and time information and position information, but other kinds of GPS information are also acquired. In addition, the video data control unit 25 can also use GPS information other than date and time information and position information for its processing.

Upon receiving an instruction input from the operator, the input unit 24 decodes the accepted instructions, and transfers various kinds of command to the corresponding video data control unit 25, video data reading unit 31, still image data reading unit 34, or print control unit 36.

The video data control unit 25 performs predetermined image processing on video data transferred from the captured data storing unit 22, video data transferred from the video data decoding unit 30, or still image data transferred from the still image data decoding unit 35, and then transfers the resulting data to the external output unit 26 or the display unit 27.

When a video recording command is received from the input unit 24, the video data control unit 25 performs predetermined image processing on video data from the captured data storing unit 22, and then adds GPS information transferred from the GPS data acquiring unit 23 and transfers the resulting data to the video data encoding unit 28. When a video recording end command is received from the input unit 24, the video data control unit 25 ends the transfer of video data to the video data encoding unit 28.

When a still image cut-out command is received from the input unit 24, the video data control unit 25 acquires a still image from video data. That is, the video data control unit 25 cuts out the image (frame) at the instant the still image cut-out command is received, from the video data. In addition, the video data control unit 25 transmits image-related information for identifying the image at the instant the video data is cut out as a still image, or the image several seconds after the instant, to the still image data encoding unit 32. Hereinafter, the image at the instant a still image is cut out, or the image several seconds after the instant will be generically referred to as the original cut-out image.

Examples of information related to the original cut-out image include GPS information added to video data, and position information of a chapter embedded into video data when cutting out a still image. It should be noted that other kinds of information may also be used, as long as the original cut-out image cut out as a still image can be identified from video on the basis of this information.

The external output unit 26 includes an interface such as HDMI (High-Definition Multimedia Interface), and outputs video data from the video data control unit 25 to connected external output equipment such as a television receiver.

The display unit 27 is a display apparatus built in an apparatus, such as a liquid crystal panel. The display unit 27 displays video corresponding to video data from the video data control unit 25 or a still image corresponding to still image data.

The video data encoding unit 28 encodes video data or the like transferred from the video data control unit 25 into a video format such as MPEG (Moving Picture Experts Group), and transfers the encoded video data to the video data recording unit 29.

The video data recording unit 29 records the video data from the video data encoding unit 28 onto the video data recording medium 12. It is also possible to build a network interface in the video data recording unit 29 so that recording is performed with respect to a disc on an external server.

The video data decoding unit 30 decodes video data encoded in MPEG or the like, and transfers the decoded data to the video data control unit 25.

When a video playback command is received from the input unit 24, the video data reading unit 31 reads video data from the video data recording medium 12, and transfers the read video data to the video data decoding unit 30. When a video playback end command is received from the input unit 24, the video data reading unit 31 ends reading of video data.

Information related to still image data and the original cut-out image cut out as a still image is transferred from the video data control unit 25 to the still image data encoding unit 32. The still image data encoding unit 32 adds the information related to the original cut-out image to the still image data, and encodes the still image data to which the above-mentioned information has been added. Specifically, the still image data encoding unit 32 embeds the information related to the original cut-out image into the still image data in EXIF (Exchangeable Image File Format), and encodes the resulting data into an image format such as JPEG (Joint Photographic Experts Group). The still image data encoding unit 32 transfers the encoded still image data to the still image data recording unit 33.

The still image data recording unit 33 records the still image data transferred from the still image data encoding unit 32 onto the still image data recording medium 13. It is also possible to build a network interface in the still image data recording unit 33 so that recording is performed with respect to a disc on an external server. While the media to which the video data recording unit 29 and the still image data recording unit 33 respectively write data are separately described in the example of FIG. 1, a single video data recording medium 12 can serve as such media.

When a still image playback command is received from the input unit 24, the still image data reading unit 34 reads still image data from the still image data recording medium 13, and transfers the read still image data to the still image data decoding unit 35.

The still image data decoding unit 35 decodes still image data encoded in JPEG or the like, and extracts information (hereinafter, also referred to as additional data) related to the original cut-out image cut out as a still image added to the still image data. The still image data decoding unit 35 transfers still image data to be displayed on the display unit 27 or the like to the video data control unit 25, and transfers still image data and additional data to be printed to the print control unit 36.

The print control unit 36 embeds the additional data added to the still image data transferred from the still image data decoding unit 35, into the still image data as a two-dimensional code such as a QR code or a cyber code, or as a digital watermark. The print control unit 36 transfers the still image data with the embedded additional data to the connected printer 14 so that the still image data is printed on a photographic mount.

The video data recording medium 12 and the still image data recording medium 13 are each configured by media with a relatively large capacity, for example, an optical disc such as a DVD (Digital Versatile Disk) or a Blu-ray Disc. While in the example of FIG. 1 the video data recording medium 12 and the still image data recording medium 13 are each configured by a removable optical disc, these media may each be also configured by a magnetic disk such as a hard disk built in the video recording/playback apparatus 11, a semiconductor memory, or the like.

The printer 14 prints the still image data transferred from the print control unit 36 onto a photographic mount. Thus, a still image with a digital watermark superimposed thereon is printed as a photograph.

Figure 2:
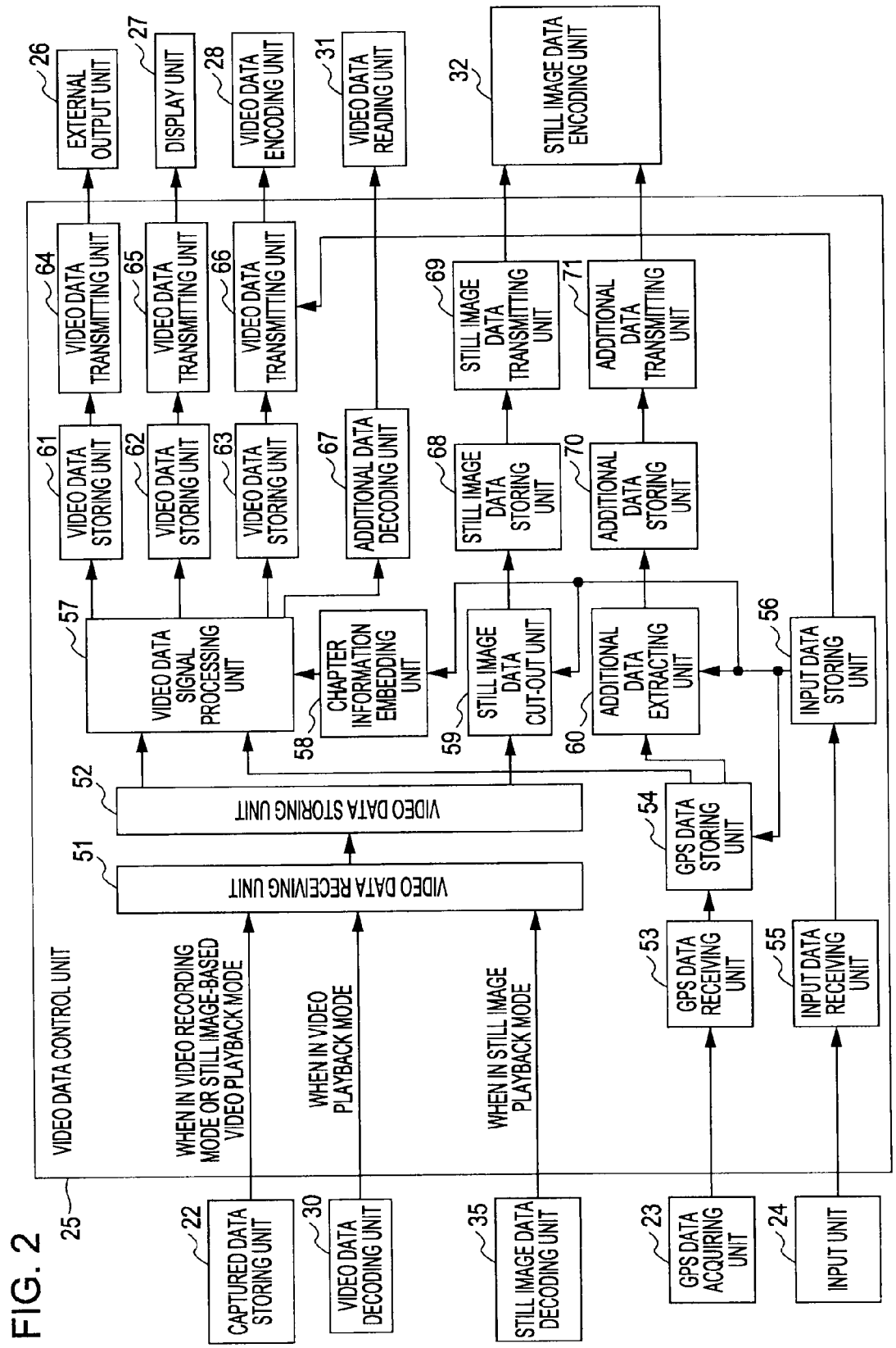
FIG. 2 is a block diagram showing a detailed configuration example of a video data control unit.

FIG. 2 shows a detailed configuration example of the video data control unit 25 shown in FIG. 1.

In the example shown in FIG. 2, the video data control unit 25 includes a video data receiving unit 51, a video data storing unit 52, a GPS data receiving unit 53, a GPS data storing unit 54, an input data receiving unit 55, and an input data storing unit 56. In addition, the video data control unit 25 includes a video data signal processing unit 57, a chapter information embedding unit 58, a still image data cut-out unit 59, an additional data extracting unit 60, video data storing units 61 to 63, and video data transmitting units 64 to 66. Further, the video data control unit 25 includes an additional data decoding unit 67, a still image data storing unit 68, a still image data transmitting unit 69, an additional data storing unit 70, and an additional data transmitting unit 71.

The video recording/playback apparatus 11 has a video recording (recording) mode, a video playback mode, a still image-based video playback mode, a still image playback mode, a print mode, and a standby mode as its function modes.

The video data recording unit 51 receives video data acquired by the image capturing unit 21 from the captured data storing unit 22, when in the video recording mode or the still image-based video playback mode. In addition, when in the video playback mode, the video data receiving unit 51 receives video data decoded by the video data decoding unit 30, and when in the still image playback mode, the video data decoding unit 30 receives still image data decoded by the still image data decoding unit 35. The video data receiving unit 51 transfers the received video data (including still image data) to the video data storing unit 52.

The video data storing unit 52 receives the video data from the video data receiving unit 51, stores several frames' worth of the video data, and transfers the video data to the video data signal processing unit 57 and the still image data cut-out unit 59.

The GPS data receiving unit 53 receives GPS information (date and time information and position information) from the GPS data acquiring unit 23, and transfers the received GPS information to the GPS data storing unit 54. The GPS data storing unit 54 stores the GPS information from the GPS data receiving unit 53 for a predetermined time. When a still image cut-out command is received from the input data storing unit 56, the GPS data storing unit 54 transfers the GPS information at or several seconds before the instant the still image cut-out command is received, to the additional data extracting unit 60.

The input data receiving unit 55 receives various kinds of command corresponding to instruction inputs from the operator, and transfers the various kinds of command to the input data storing unit 56. The input data storing unit 56 stores one or more of the various kinds of command received from the input data receiving unit 55 within a fixed time, and transfers each such command to the GPS data storing unit 54, the chapter information embedding unit 58, the still image data cut-out unit 59, and the additional data extracting unit 60, or to the video data transmitting unit 66.

The video data signal processing unit 57 performs predetermined image signal processing in accordance with the data output destination, such as resolution conversion or correction, on video data from the video data storing unit 52, and transfers the resulting data to the corresponding video data storing units 61 to 63. At this time, when in the video recording mode, the video data signal processing unit 57 adds (embeds) GPS information stored in the GPS data storing unit 54 into the video data. In addition, when a chapter embedding instruction is received from the chapter information embedding unit 58, the video data signal processing unit 57 embeds a chapter into the video at a designated timing.

When in the still image-based video playback mode, the video data signal processing unit 57 transfers video data captured by the image capturing unit 21 to the additional data decoding unit 67, in order to decode a two-dimensional code or a digital watermark embedded in an image and printed on a photograph.

When a still image cut-out command is received from the input data storing unit 56, the chapter information embedding unit 58 transmits a chapter embedding command so that a chapter is embedded into the video data at the instant or several seconds before the still image cut-out command is received.

When a still image cut-out command is received from the input data storing unit 56, the still image data cut-out unit 59 cuts out one frame of the video signal at the instant the still image cut-out command is received, as a still image from the video data transferred from the video data storing unit 52. The still image data thus cut out is transferred to the still image data storing unit 68.

When a still image cut-out command is received from the input data storing unit 56, the additional data extracting unit 60 receives the GPS information at or several seconds before the instant the still image cut-out command is received, from the GPS data storing unit 54 as data to be added to still image data (image-related information for identifying the original cut-out image cut out as a still image). The received additional data is transferred to the additional data storing unit 70.

The video data storing units 61 to 63 respectively store several frames' worth of video data processed by the video data signal processing unit 57, and transfer the video data to the video data transmitting units 64 to 66.

The video data transmitting units 64 to 66 respectively receive the video data processed by the video data signal processing unit 57 from the corresponding video data storing units 61 to 63. The video data transmitting unit 64 and the video data transmitting unit 65 transmit the video data to the external output unit 26 and the display unit 27, respectively. When a video recording command is received from the input data storing unit 56, the video data transmitting unit 66 transmits the video data to the video data encoding unit 28.

The additional data decoding unit 67 decodes a two-dimensional code such as a QR code or a cyber code, or a digital watermark which is contained in the video data from the video data signal processing unit 57. Thus, the additional data decoding unit 67 acquires information related to the original cut-out image cut out as a still image, from video data obtained by printing a still image and shooting the print (photograph) by the image capturing unit 21. The decoded image-related information is transferred to the video data reading unit 31.

The still image data storing unit 68 temporarily stores one or more pieces of still image data transferred from the still image data cut-out unit 59, and transfers the still image data to the still image data transmitting unit 69. The still image data transmitting unit 69 receives the still image data from the still image data storing unit 68, and transmits the still image data to the still image data encoding unit 32.

The additional data storing unit 70 temporarily stores additional data from the additional data extracting unit 60, and transfers the additional data to the additional data transmitting unit 71. The additional data transmitting unit 71 transmits the additional data transferred from the additional data storing unit 70, to the still image data encoding unit 32.

Next, operation of the video recording/playback apparatus 11 will be described. When the operator presses a recording start button (not shown) of the video recording/playback apparatus 11, in response to this operation, a video recording command is issued from the input unit 24, causing the function mode of the video recording/playback apparatus 11 to switch to the video recording mode.

On the basis of this video recording command, the video data receiving unit 51 receives video data that has been accumulated by the image capturing unit 21 and stored in the image data storing unit 22. The received video data is transferred to the video data signal processing unit 57 via the video data storing unit 52. The video data signal processing unit 57 adds GPS information stored in the GPS data storing unit 54 to the video data from the video data storing unit 52. At this time, instead of GPS information, the date and time information of a built-in block can be also added.

The video data with added GPS information undergoes predetermined image processing, and is then transferred to the video data encoding unit 28 for encoding, via the video data storing unit 63 and the video data transmitting unit 66. The encoded video data is transferred to the video data recording unit 29, and recorded onto the video data recording medium 12. At this time, the video data with added GPS information is also transferred to the display unit 27 via the video data storing unit 62 and the video data transmitting unit 65 so that corresponding video is displayed on the display unit 27. This allows the operator to check the video being recorded.

When the operator selects a desired video from a displayed menu, and presses a playback button (not shown) of the video recording/playback apparatus 11, in response to this operation, a video playback command is issued from the input unit 24, causing the function mode of the video recording/playback apparatus 11 to switch to the video playback mode.

On the basis of this video playback command, video data recorded on the video data recording medium 12 is read by the video data reading unit 31, decoded by the video data decoding unit 30, and transferred to the video data signal processing unit 57 via the video data receiving unit 51 and the video data storing unit 52.

The video data signal processing unit 57 transfers the decoded video data to the display unit 27 via the video data storing unit 62 and the video data transmitting unit 65, and corresponding video is displayed on the display unit 27. In addition, the video data signal processing unit 57 transfers the decoded video data to the external output unit 26 via the video data storing unit 61 and the video data transmitting unit 64, and corresponding video is displayed on a display apparatus (not shown) that is connected via the external output unit 26.

Further, the operator switches a mode switch (not shown) of the video recording/playback apparatus 11 to the still image playback mode. In response to this operation, a still image playback command is issued from the input unit 24, causing the function mode of the video recording/playback apparatus 11 to switch to the still image playback mode.

On the basis of this still image playback command, still image data recorded on the still image data recording medium 13 is read by the still image data reading unit 34, decoded by the still image data decoding unit 35, and transferred to the video data signal processing unit 57 via the video data receiving unit 51 and the video data storing unit 52.

The video data signal processing unit 57 transfers the decoded still image data to the display unit 27 via the video data storing unit 62 and the video data transmitting unit 65, and a corresponding still image is displayed on the display unit 27. In addition, the video data signal processing unit 57 transfers the decoded still image data to the external output unit 26 via the video data storing unit 61 and the video data transmitting unit 64, and a corresponding still image is displayed on a display apparatus (not shown) that is connected via the external output unit 26.

Figure 3:
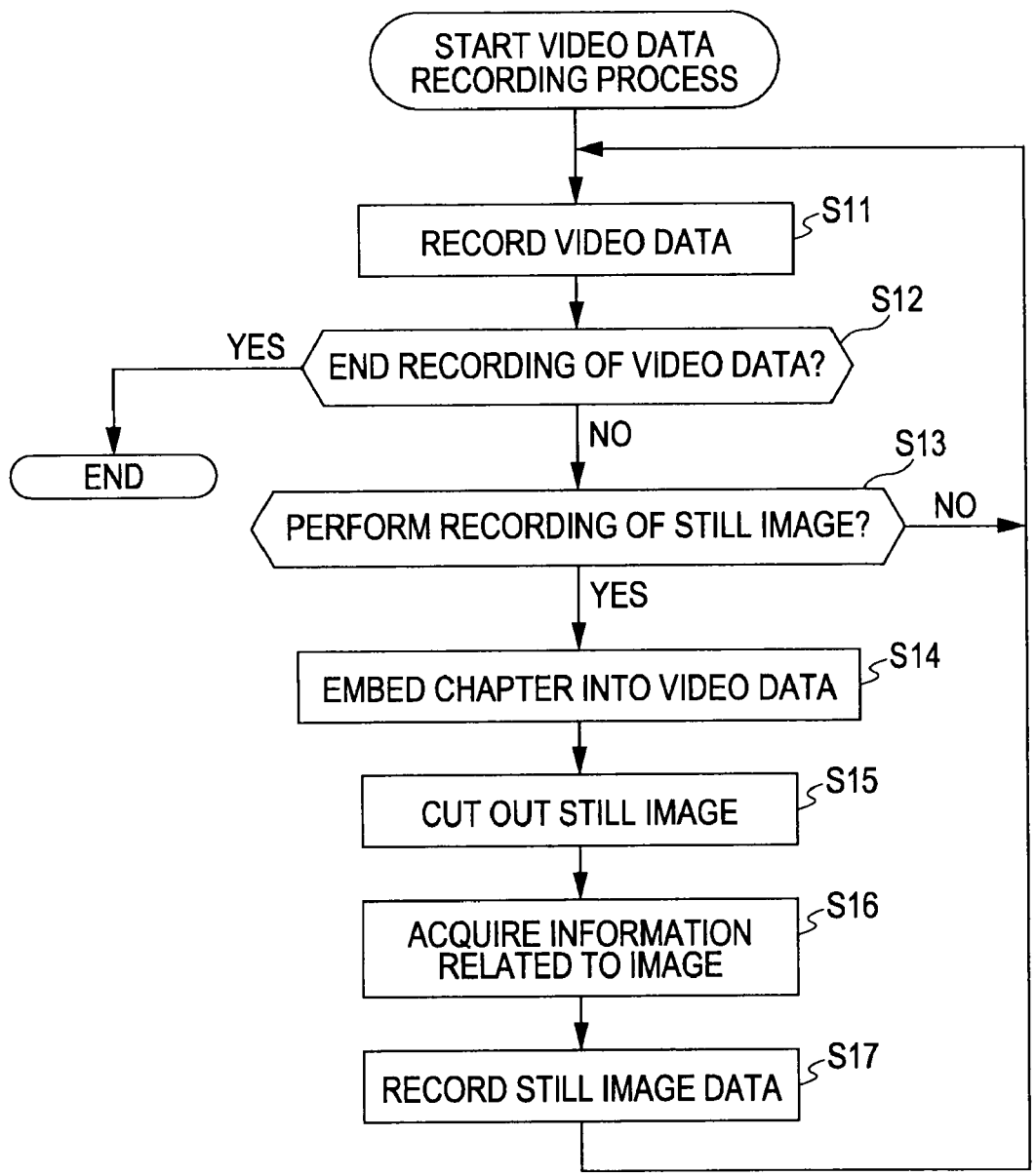
FIG. 3 is a flowchart illustrating a video data recording process.

Next, referring to the flowchart in FIG. 3, a video data recording process in the video recording/playback apparatus 11 will be described.

To shoot video (moving image), the operator presses a recording start button (not shown) of the video recording/playback apparatus 11. In response to this operation, a video recording command is issued from the input unit 24, causing the function mode of the video recording/playback apparatus 11 to switch to the video recording mode. Then, the processing in FIG. 3 is started.

On the basis of the video recording command from the input unit 24, in step S11, each corresponding unit of the video recording/playback apparatus 11 records video data captured by the image capturing unit 21 onto the video data recording medium 12.

That is, video data that has been accumulated by the image capturing unit 21 and stored in the captured data storing unit 22 is received by the video data receiving unit 51, and transferred to the video data signal processing unit 57 via the video data storing unit 52. The video data to which GPS information has been added in the video data signal processing unit 57 is transferred to the video data encoding unit 28 for encoding, via the video data storing unit 63 and the video data transmitting unit 66. The encoded video data is transferred to the video data recording unit 29, and recorded onto the video data recording medium 12.

The operator presses a recording end button (not shown) of the video recording/playback apparatus 11. In response to this operation, a video recording end command is issued from the input unit 24.

In step S12, each corresponding unit of the video recording/playback apparatus 11 determines whether or not to end recording of video data, and if, on the basis of a video recording end command from the input unit 24, it is determined to end recording of video data, the video data recording process is ended.

On the other hand, if a video recording end command is not issued, and it is thus determined in step S12 not to end recording of video data, the processing proceeds to step S13, and it is determined whether or not to perform recording of a still image. If a still image cut-out command is not issued, and it is thus determined in step S13 not to perform recording of a still image, the processing returns to step S11, and the subsequent processing is repeated.

When the operator finds a scene he/she likes during video recording, to shoot the scene as a still image, the operator presses a still image acquisition shutter button (not shown) of the video recording/playback apparatus 11. In response to this operation, a still image cut-out command is issued from the input unit 24.

The still image cut-out command from the input unit 24 is transferred to the GPS data storing unit 54, the chapter information embedding unit 58, the still image data cut-out unit 59, and the additional data extracting unit 60, via the input data receiving unit 55 and the input data storing unit 56.

If it is determined in step S13 to perform recording of a still image, the processing proceeds to step S14. In step S14, the chapter information embedding unit 58 embeds a chapter (separator information) into the video data at, or several seconds before, the instant the still image cut-out command is issued.

Specifically, the chapter information embedding unit 58 transmits a chapter embedding command to the video data signal processing unit 57 so as to embed a chapter into the video data at, or several seconds before, the instant the still image cut-out command is received. Upon receiving the chapter embedding command from the chapter information embedding unit 58 in response to this operation, the video data signal processing unit 57 embeds the chapter into the video at the designated timing.

In step S15, the still image data cut-out unit 59 cuts out one frame of video signal at the instant the still image cut-out command is received, as a still image. The still image data thus cut out is transferred to the still image data encoding unit 32 via the still image data storing unit 68 and the still image data transmitting unit 69.

In step S16, the additional data extracting unit 60 acquires information related to the original cut-out image cut out as the still image in step S15. That is, the additional data extracting unit 60 acquires, from the GPS data storing unit 54, the GPS information at or several seconds before the instant the still image cut-out command is received, as data to be added to still image data (information related to the original cut-out image cut out as the still image). The acquired GPS information is transferred to the still image data encoding unit 32 via the additional data storing unit 70 and the additional data transmitting unit 71.

In step S17, the still image data encoding unit 32 converts the GPS information into the EXIF format, and adds the converted GPS information to the still image data. The still image data recording unit 33 records the still image data with the added GPS information onto the still image data recording medium 13. Thereafter, the processing returns to step S11, and the subsequent processing is repeated.

Figure 4:
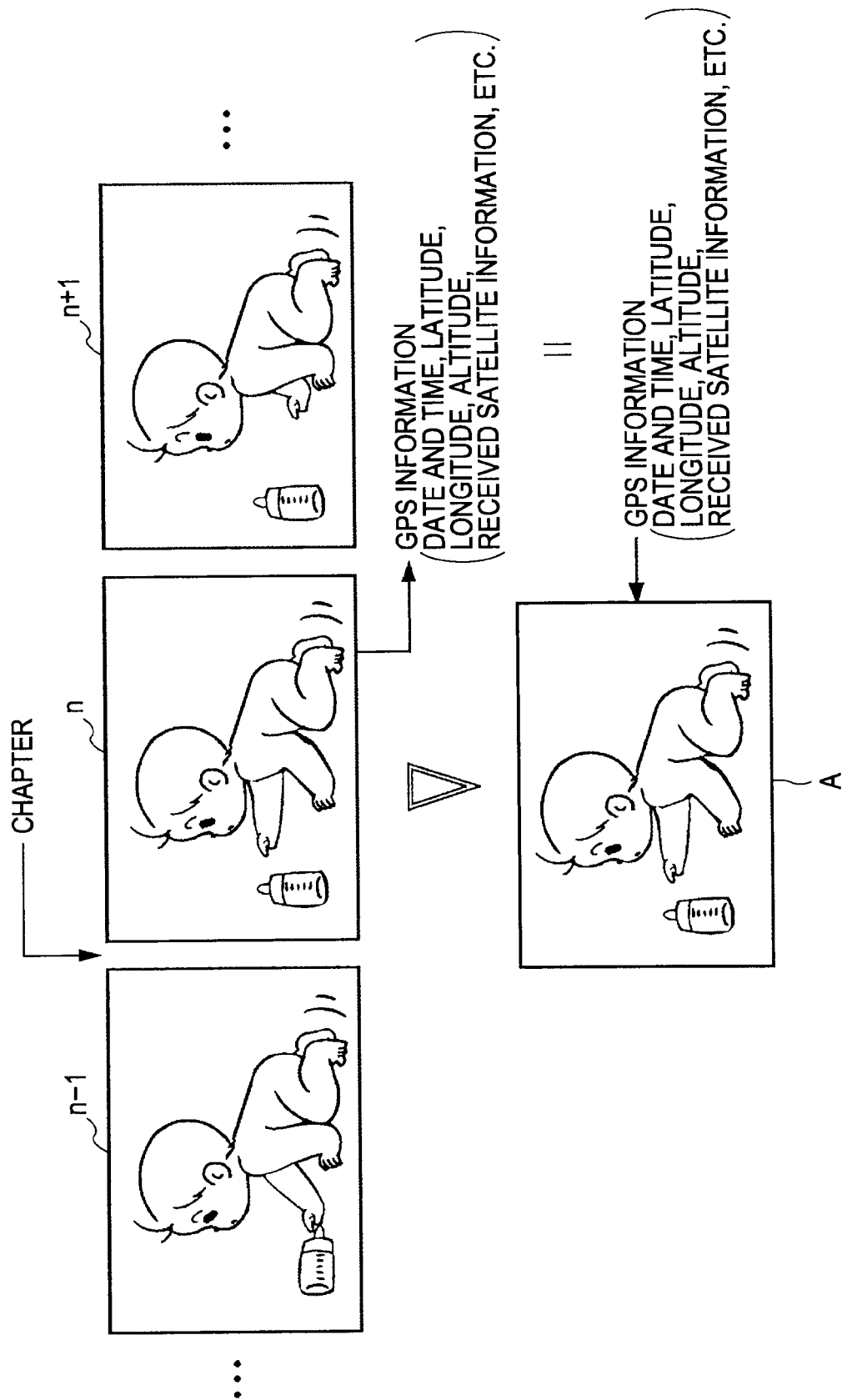
FIG. 4 is a diagram illustrating the processes from steps S14 to S17 shown in FIG. 3.

Now, referring to FIG. 4, the processes from steps S14 to S17 described above will be specifically described.

FIG. 4 shows a frame n−1, a frame n, and a frame n+1 of video. Corresponding GPS information is added to each of the frame n−1, the frame n, and the frame n+1. It should be noted that during recording of video, GPS information is added to video data in a parallel fashion, whereas during playback, GPS information has been already added to video data.

For example, when the frame n is to be cut out as a still image A, in step S14, a chapter is embedded into the frame n at the instant the still image A is cut out, and in step S15, the frame n is cut out as the still image A. Then, in step S16, GPS information at the instant the still image A is cut out is acquired, and in step S17, the GPS information is added to the still image A for recording.

At this time, individual pieces of the GPS information added to the frame n (for example, date and time, latitude, longitude, altitude, received satellite information, and so on), and individual pieces of the GPS information added to the still image A all have the same values, including errors that occur at the time of analysis. That is, GPS information is singular, unique information.

Therefore, to perform playback from the frame n from which the still image A is cut out, by searching for a frame to which the same GPS information as the GPS information added to the still image A is added, video can be easily played back from a desired position.

In addition, at the time of the above search, only frames with an embedded chapter are searched through. Thus, the processing load that would be placed if all frames were searched through can be reduced, thereby enabling high-speed search.

It is not necessary to add all the pieces of GPS information to the still image. For example, only position information, or only date and time information may be added.

If the embedding of a chapter and the acquisition of GPS information added to a still image are to be done at the instant the still image is cut out, video can be played back from a desired position (image). In this regard, if the timing of these operations is set slightly before (for example, two, three, five, or ten seconds before) the instant the still image is cut out, video can be played back from slightly before a desired position (image). In this case, it is possible to prevent the desired position from being missed immediately after playback. It should be noted that the expression "slightly before" refers not only to several seconds before, but can also refer to ten and several seconds before, or several tens of seconds before.

As described above, in the video recording/playback apparatus 11, during recording of video data, GPS information, which serves as information for identifying the image at or slightly (several seconds) before the instant a still image cut-out command is issued, is added to the cut out still image data. Thus, by simply selecting a still image that can be searched for more easily than a moving image, on the basis of GPS information added to the still image, a desired video position (video position corresponding to the still image) can be easily located from recorded video.

In addition, since a chapter is embedded into the video data at or several seconds before the instant a still image cut-out command is issued, a desired video position can be located easily and at high speed from recorded video.

Figure 5:
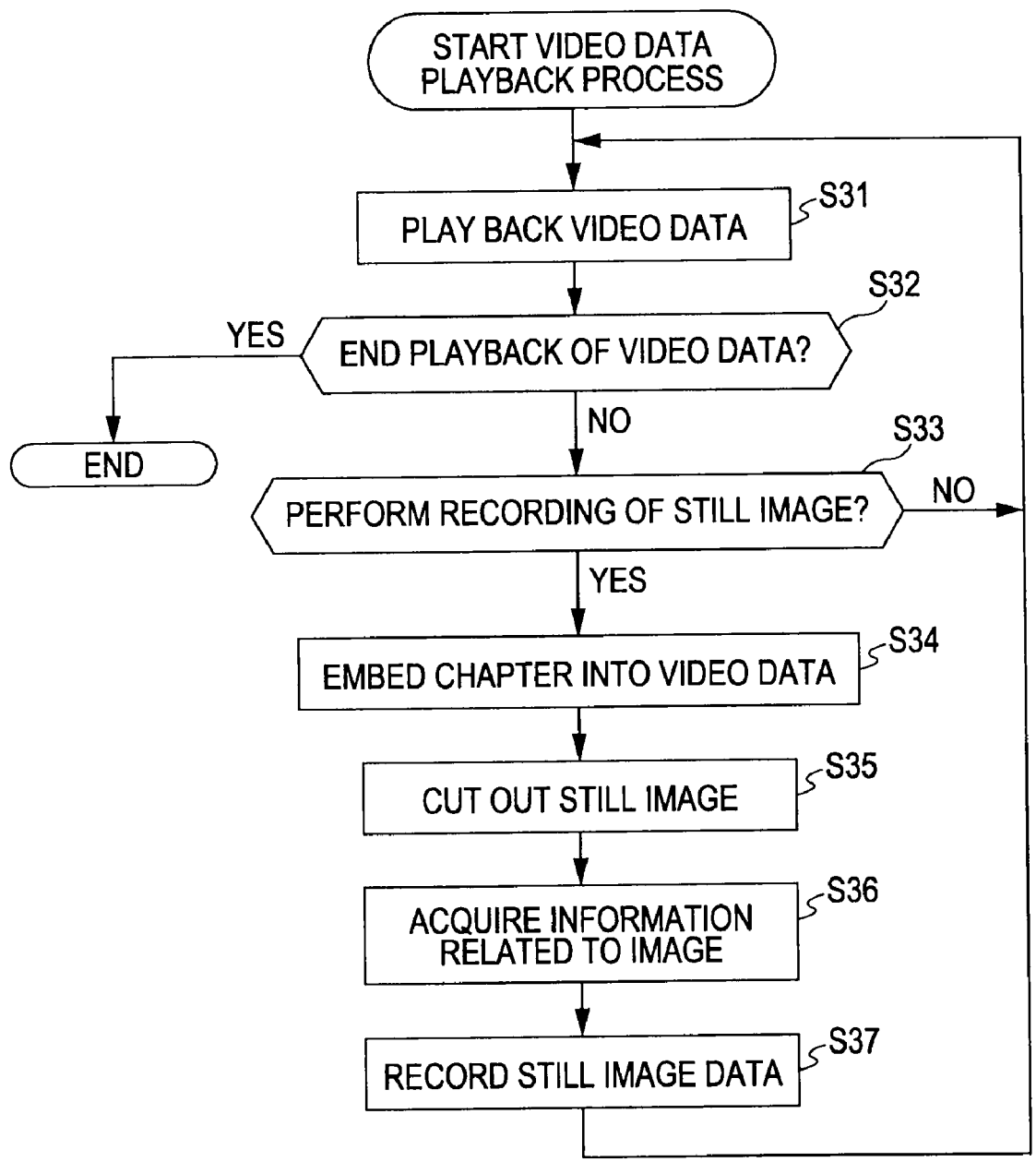
FIG. 5 is a flowchart illustrating a video data playback process in a video recording/playback apparatus.

Next, referring to the flowchart in FIG. 5, a video data playback process in the video recording/playback apparatus 11 will be described. Since steps S34 to S37 in FIG. 5 are basically the same processes as those of steps S14 to S17 in FIG. 3, their detailed description is omitted to avoid repetition.

For example, to view recorded video, the operator connects the video recording/playback apparatus 11 to a television apparatus (not shown) via a HDMI cable, selects a desired video from a menu displayed on a display unit of the television apparatus, and presses a playback start button (not shown) of the video recording/playback apparatus 11. In response to this operation, a video playback command is issued from the input unit 24, causing the function mode of the video recording/playback apparatus 11 to switch to the video playback mode. Then, the processing in FIG. 5 is started.

On the basis of the video playback command from the input unit 24, in step S31, each corresponding unit of the video recording/playback apparatus 11 plays back video data recorded on the video data playback medium 12.

That is, video data recorded on the video data recording medium 12 is read by the video data reading unit 31, decoded by the video data decoding unit 30, and transferred to the video data signal processing unit 57 via the video data receiving unit 51 and the video data storing unit 52. The decoded video data is transferred by the video data signal processing unit 57 to the external output unit 26 via the video data storing unit 61 and the video data transmitting unit 64, and corresponding video is displayed on the display unit of the television apparatus that is connected via the external output unit 26.

The operator presses a playback end button (not shown) of the video recording/playback apparatus 11. In response to this operation, a video playback end command is issued from the input unit 24.

In step S32, each corresponding unit of the video recording/playback apparatus 11 determines whether or not to end playback of video data, and if, on the basis of a video playback end command from the input unit 24, it is determined to end playback of video data, the video data playback process is ended.

On the other hand, if a video playback end command is not issued, and it is thus determined in step S32 not to end playback of video data, the processing proceeds to step S33, and it is determined whether or not to perform playback of a still image. If a still image cut-out command is not issued, and it is thus determined in step S33 not to perform playback of a still image, the processing returns to step S31, and the subsequent processing is repeated.

When the operator finds a scene he/she likes during video playback, to shoot the scene as a still image, the operator presses a still image acquisition shutter button (not shown) of the video recording/playback apparatus 11. In response to this operation, a still image cut-out command is issued from the input unit 24.

The still image cut-out command from the input unit 24 is transferred to the GPS data storing unit 54, the chapter information embedding unit 58, the still image data cut-out unit 59, and the additional data extracting unit 60, via the input data receiving unit 55 and the input data storing unit 56.

If it is determined in step S33 to perform recording of a still image, the processing proceeds to step S34. In step S34, the chapter information embedding unit 58 embeds a chapter into the video data at or several seconds before the instant the still image cut-out command is issued.

Specifically, the chapter information embedding unit 58 transmits a chapter embedding command to the video data signal processing unit 57 so as to embed a chapter into the video data at the instant the still image cut-out command is received, or several seconds before the instant. Upon receiving the chapter embedding command from the chapter information embedding unit 58 in response to this operation, the video data signal processing unit 57 embeds the chapter into the video at the designated timing.

In step S35, the still image data cut-out unit 59 cuts out one frame of video signal at the instant the still image cut-out command is received, as a still image. The still image data thus cut out is transferred to the still image data encoding unit 32 via the still image data storing unit 68 and the still image data transmitting unit 69.

In step S36, the additional data extracting unit 60 acquires information related to the original cut-out image cut out as the still image in step S35. That is, the additional data extracting unit 60 acquires, from the GPS data storing unit 54, the GPS information at or several seconds before the instant the still image cut-out command is received, as data to be added to still image data (information related to the original cut-out image cut out as the still image). The acquired GPS information is transferred to the still image data encoding unit 32 via the additional data storing unit 70 and the additional data transmitting unit 71.

The information related to the original cut-out image cut out as a still image which is added by the additional data extracting unit 60 is not limited to the GPS information described above. The additional data extracting unit 60 can also acquire, from video data stored in the video data storing unit 52, date and time information (based on an internal clock of the video recording/playback apparatus 11 to which the video data is recorded, for example) added to video data at the time of recording, and add the acquired date and time information to the still image. In cases when the date and time information is added to video data by the video data signal processing unit 57, such as when recording the video data, the date and time information may be directly acquired from the video data signal processing unit 57, or from the internal clock.

In addition, when issuing a chapter embedding command, it is also possible for the chapter information embedding unit 58 to also issue a signal indicating the position where a chapter is to be embedded (for example, a chapter number) and embed the signal as the chapter, and also acquire the signal as information related to the original cut-out image cut out as a still image and add the signal to the still image.

In step S37, the still image data encoding unit 32 converts the GPS information into the EXIF format, adds the converted GPS information to still image data, and records the still image data with the added GPS onto the still image data recording medium 13.

As described above, in the video recording/playback apparatus 11, during playback of video data as well, as information for identifying the image at or several seconds before the instant a still image cut-out command is issued, GPS information is added to the cut out still image data. Thus, when playing back video data on the basis of a still image, a desired video position can be easily located from recorded video on the basis of GPS information added to the still image.

While the above description is directed to the case in which information related to the original cut-out image is added to the EXIF of a still image, if the adopted format is of a type that does not embed the EXIF, such as JPEG, image data is embedded into an area for writing comment or the like.

In addition, the above description is directed to the case of recording a still image and embedding a chapter during recording or playback of video data. However, in cases where, for example, embedding of a chapter into video data takes time, and real-time processing is difficult, as will be described later with reference to FIG. 6, it is also possible to embed a chapter during standby of the video recording/playback apparatus 11.

Figure 6:
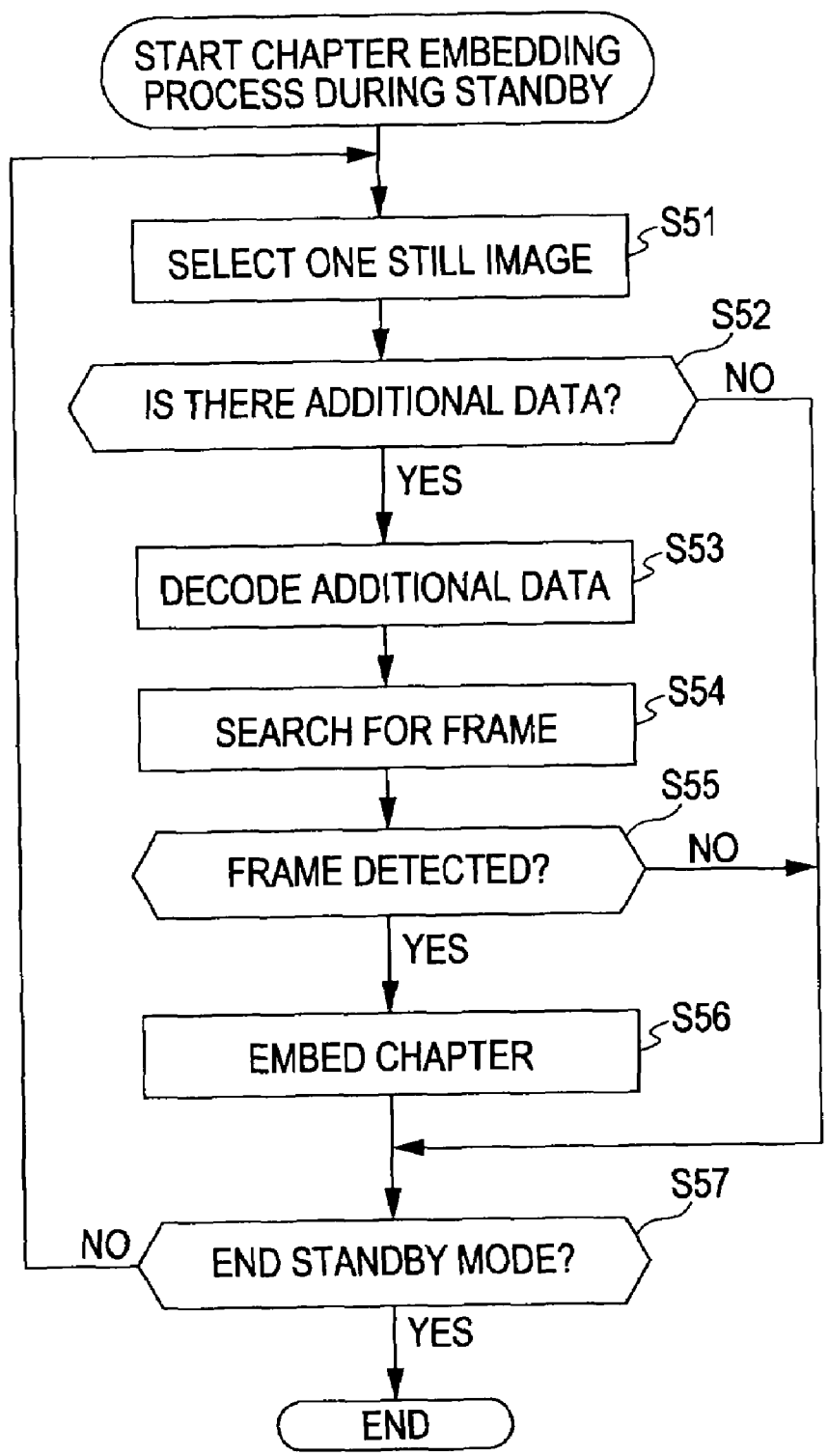
FIG. 6 is a flowchart illustrating a chapter embedding process during standby.

FIG. 6 is a flowchart illustrating an example of chapter embedding process during standby of the video recording/playback apparatus 11. In this case, before the standby mode is entered, the processing in FIG. 3 excluding step S14, or the processing in FIG. 5 excluding step S34 has already been performed.

For example, the operator switches a mode switch (not shown) of the video recording/playback apparatus 11 to the standby mode. In response to this operation, a standby command is issued from the input unit 24, causing the function mode of the video recording/playback apparatus 11 to switch to the standby mode. Alternatively, if no operation is made to the video recording/playback apparatus 11 for a fixed period of time, the function mode of the video recording/playback apparatus 11 switches to the standby mode, and the processing in FIG. 6 is started.

In step S51, the still image data reading unit 34 selects and reads one still image recorded on the still image data recording medium 13. At this time, efficient processing can be performed if, with respect to a still image that has already been selected, a flag to that effect is embedded in the still image, or if a list of still images that have been already selected is stored in another file.

In step S52, the still image data decoding unit 35 determines whether or not the still image selected in step S51 contains additional data. That is, it is determined whether or not information related to the original cut-out image has been added to the still image. If it is determined in step S52 that the still image contains additional data, in step S53, the still image decoding unit 35 decodes the additional data of the still image.

The decoded additional data is transferred to the video data signal processing unit 57 via the video data receiving unit 51 and the video data storing unit 52. On the other hand, the video data read by the video data reading unit 31 from the video data recording medium 12 is decoded by the video data decoding unit 30, and transferred to the video data signal processing unit 57 via the video data receiving unit 51 and the video data storing unit 52.

In step S54, the video data signal processing unit 57 searches for a frame having the same additional data as the additional data added to the still image, and in step S55, the video data signal processing unit 57 determines whether or not such a frame has been detected. For example, if a frame having the same GPS information as the GPS information added to the still image has been detected, in step S56, the video data signal processing unit 57 embeds a chapter into the detected frame.

On the other hand, if it is determined in step S52 that there is no additional data, the processes from steps S53 to S56 are skipped, and the processing proceeds to step S57. If it is determined in step S55 that no frame has been detected, the process of step S56 is skipped, and the processing proceeds to step S57.

In step S57, each corresponding unit of the video recording/playback apparatus 11 determines whether or not to end the standby mode. If a command other than a standby command has been issued from the input unit 24, it is determined in step S57 to end the standby mode, and the chapter embedding process during standby is ended.

If it is determined in step S57 not to end the standby mode, the processing returns to step S51, and the subsequent processing is repeated.

As described above, in the video recording/playback apparatus 11, embedding of a chapter into video data is performed during the standby mode. Thus, even if recording of a still image is performed at the time of recording or playback of video data, the influence of the processing load imposed by the chapter embedding can be reduced, thus allowing for a smooth recording/playback process.

Next, referring to the flowchart in FIG. 7, a still image data playback process in the video recording/playback apparatus 11 will be described.

For example, to view recorded still images, the operator connects the video recording/playback apparatus 11 to the television apparatus (not shown) via a HDMI cable, and switches the mode switch (not shown) of the video recording/playback apparatus 11 to the still image playback mode. In response to this operation, a still image playback command is issued from the input unit 24, causing the function mode of the video recording/playback apparatus 11 to switch to the still image playback mode. Then, the processing in FIG. 7 is started.

In step S71, the still image data reading unit 34 searches through the still image data recording medium 13 to determine whether or not there is still image data on the still data recording medium 13. If it is determined in step S71 that there is no still image data on the still image data recording medium 13, the still image data playback process is ended.

If it is determined in step S71 that there is still image data on the still image data recording medium 13, the processing proceeds to step S72.

In step S72, each corresponding unit of the video recording/playback apparatus 11 displays a list of still images corresponding to still image data recorded on the still image data recording medium 13, on the display unit of the television apparatus.

That is, video data recorded on the still image data recording medium 13 is read by the still image data reading unit 34. Thumbnail images of the video data are decoded by the still image data decoding unit 35, and transferred to the video data signal processing unit 57 via the video data receiving unit 51 and the video data storing unit 52.

The video data signal processing unit 57 creates a list of the decoded thumbnail images of still image data, and transfers the data of the created list of thumbnail images to the external output unit 26 via the video data storing unit 61 and the video data transmitting unit 64. Thus, the list of corresponding thumbnail images is displayed on the display apparatus (not shown) that is connected via the external output unit 26.

The operator presses a still image playback end button (not shown) of the video recording/playback apparatus 11. In response to this operation, a still image playback end command is issued from the input unit 24.

In step S73, each corresponding unit of the still image recording/playback apparatus 11 determines whether or not to end playback of still image data, and if, on the basis of a still image playback end command from the input unit 24, it is determined to end playback of still image data, the still image data playback process is ended.

On the other hand, if a still image playback end command is not issued, and it is thus determined in step S73 not to end playback of still image data, the processing proceeds to step S74, and it is determined whether or not a still image has been selected. If a still image selection command is not issued, and it is not determined in step S74 that a still image has been selected, the processing returns to step S72, and the subsequent processing is repeated.

The operator selects one still image by operating a cross key or an enter key (not shown) of the video recording/playback apparatus 11, while looking at the list of still images displayed on the display unit of the television apparatus. In response to this operation, a still image selection command is issued from the input unit 24.

If, on the basis of the still image selection command, it is determined in step S74 that a still image has been selected, the processing proceeds to step S75, and the selected still image is displayed on the display apparatus (not shown).

That is, still image data corresponding to the selected still image is read by the still image data reading unit 34 from the still image data recording medium 13, decoded by the still image data decoding unit 35, and transferred to the video data signal processing unit 57 via the video data receiving unit 51 and the video data storing unit 52.

The video data signal processing unit 57 transfers the decoded still image data to the external output unit 26 via the video data storing unit 61 and the video data transmitting unit 64. Thus, a corresponding still image is displayed on the display apparatus (not shown) that is connected via the external output unit 26.

After step S75, the processing proceeds to step S76, and it is determined whether or not to end the display of the still image. If it is determined in step S76 not to end the display of the still image, the processing returns to step S75, and the subsequent processing is repeated.

The operator presses a return button (not shown) of the video recording/playback apparatus 11. In response to this operation, a still image display end command is issued from the input unit 24. If, on the basis of the still image display end command, it is determined in step S76 to end the display of the still image, the processing returns to step S72, and the subsequent processing is repeated.

In this way, since a list of still images is displayed, by browsing the still images recorded on the still image data recording medium 13, the operator can print a desired still image on the printer 14 as will be described next with reference to FIG. 8, or play back video data from an image corresponding to a desired still image as will be described later with reference to FIG. 12.

Next, referring to the flowchart in FIG. 8, a still image printing process in the video recording/playback apparatus 11 will be described.

Figure 7:
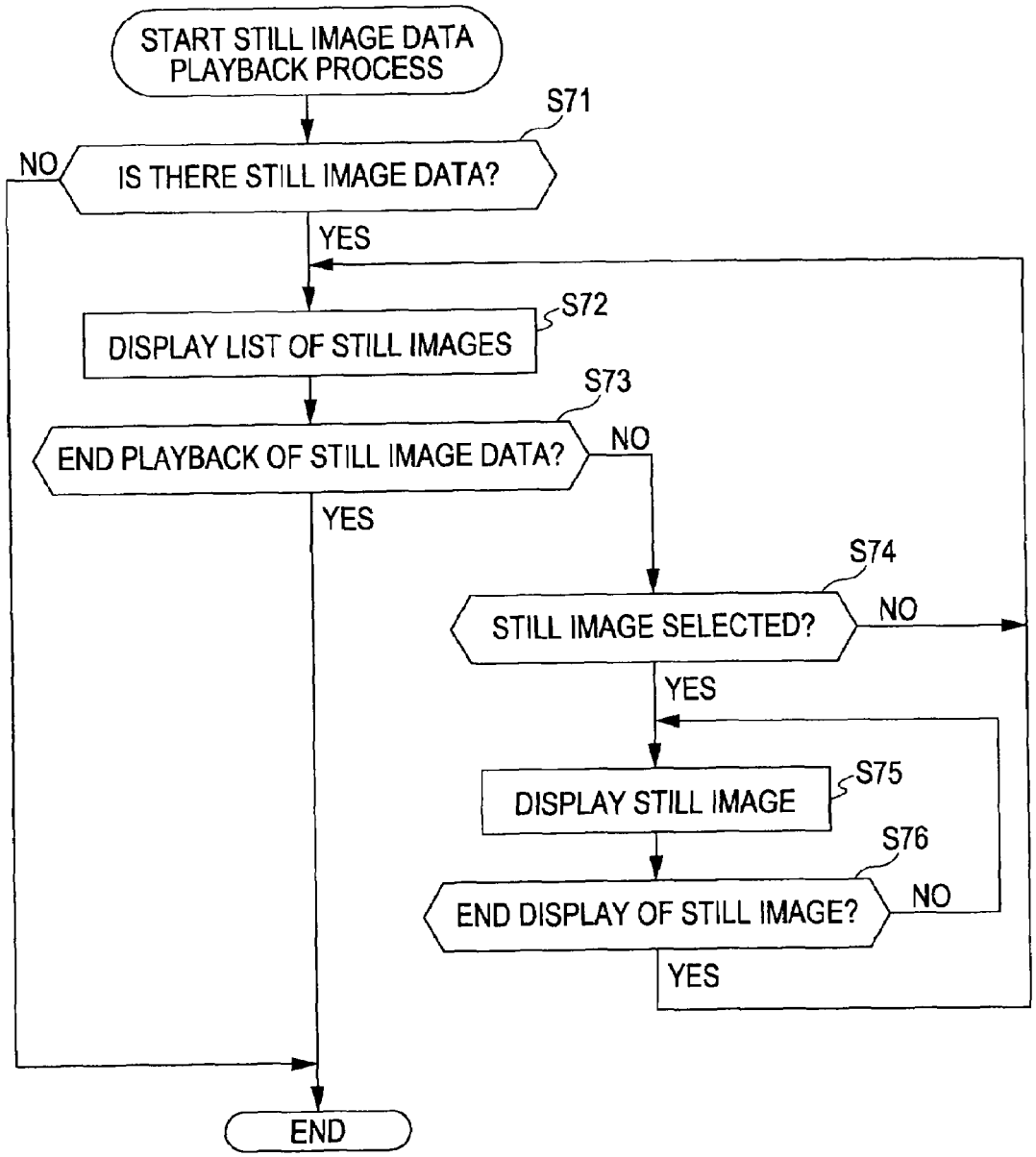
FIG. 7 is a flowchart illustrating a still image data playback process.

For example, when a list of still images (thumbnail images) is being displayed in step S72 in FIG. 7 described above, the operator selects one still image, and switches the mode switch (not shown) of the video recording/playback apparatus 11 to the print mode. Alternatively, when a still image is being displayed in step S75 in FIG. 7, the operator switches the mode switch (not shown) of the video recording/playback apparatus 11 to the print mode.

Figure 8:
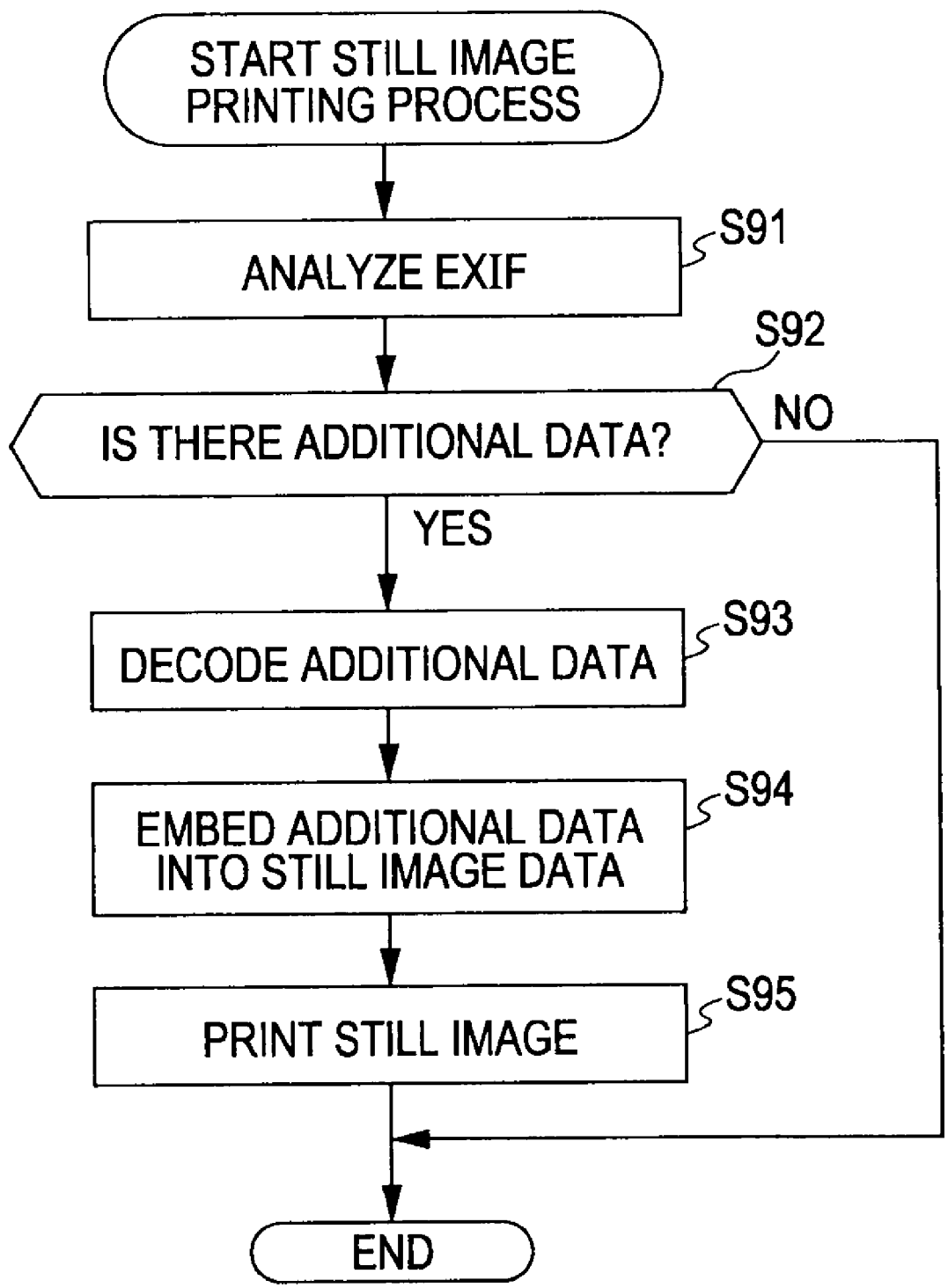
FIG. 8 is a flowchart illustrating a still image data printing process.

In response to this operation, a print command is issued from the input unit 24, causing the function mode of the video recording/playback apparatus 11 to switch to the print mode, and then the processing in FIG. 8 is started. The still image data reading unit 34 transfers the still image data selected from the still image data recording medium 13 to the still image data decoding unit 35.

In step S91, the still data decoding unit 35 analyzes the EXIF of the selected still image data. In step S92, the still image data decoding unit 35 determines whether or not the EXIF data contains additional data indicating information (for example, GPS information) related to the original cut-out image cut out as a still image.

If it is determined in step S92 that the EXIF data contains additional data, the processing proceeds to step S93. In step S93, the still image data decoding unit 35 decodes the additional data. That is, the still image data decoding unit 35 extracts the additional data from the EXIF data, and transfers the additional data to the print control unit 36 together with the still image data.

In step S94, the print control unit 36 embeds the additional data transferred from the still image data decoding unit 35, into the still image data as a two-dimensional code such as a QR code or a cyber code, or a digital watermark. In step S95, the print control unit 36 transfers the still image data with the embedded additional data to the connected printer 14, and has the still image data printed on a photographic mount.

On the other hand, if it is determined in step S92 that the EXIF data contains no additional data, the processing proceeds to step S95, and only the still image is printed.

Figure 9:
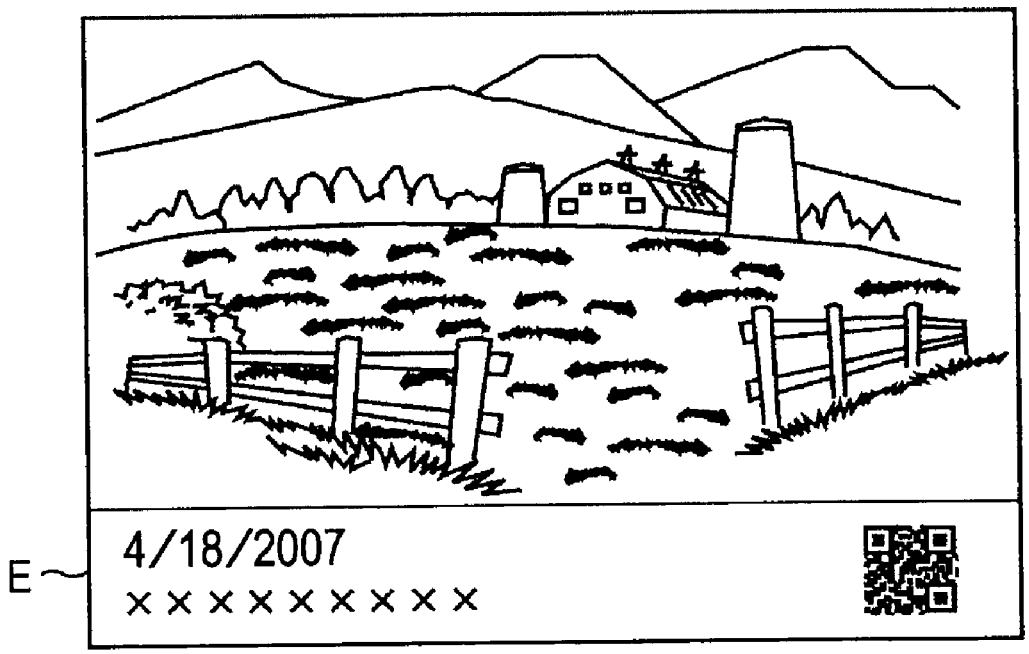
FIG. 9 is a diagram showing an example of a photograph on which a still image is printed.

FIG. 9 shows an example of a photograph on which a still image is printed. In the example shown in FIG. 9, for example, a still image cut out with an aspect ratio of 16:9 is printed in top-aligned placement on an L-sized photographic mount.

Then, in a margin portion E of the photographic mount, for example, date and time information of GPS information, the title "xxxxxxxxx" of the still image, and a two-dimensional code indicating information related to the original cut-out image cut out as the still image (GPS information) are printed.

When a still image is cut out at 16:9 from the video recording/playback apparatus 11 in this way, the margin portion E is produced upon printing the still image on a standard L-sized photographic mount. In the case of FIG. 9, by printing a two-dimensional code in this margin portion E, it is possible to make effective use of the margin.

Figure 10:
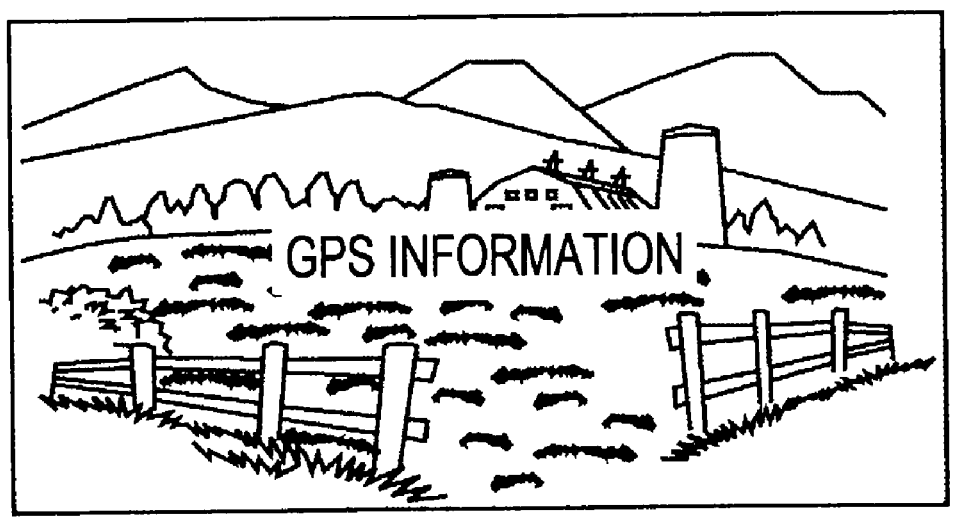
FIG. 10 is a diagram showing another example of a photograph on which a still image is printed.

FIG. 10 shows another example of a photograph on which a still image is printed. In the example shown in FIG. 10, for example, a still image cut out with an aspect ratio of 16:9 is printed on a 16:9 photographic mount. On the still image, information related to the original cut-out image cut out as the still image (GPS information) is superimposed and printed as a digital watermark on the still image.

While in the example of FIG. 10 the GPS information is a digital watermark and hence not visible to the naked eye, the GPS information is shown for the convenience of description.

That is, in the case of FIG. 10, even if the GPS information is printed, this does not obstruct the view of the user when looking at the still image.

The information related to the original cut-out image cut out as a still image is not limited to a digital watermark or a two-dimensional code. The information may be printed in any manner, as long as it does not obscure the main still image when printed on a photograph.

In the above description, the information related to the original cut-out image is added to a still image in advance, and is embedded into the image as a digital watermark or a two-dimensional code at the time of printing. However, it is also possible to embed the information related to the original cut-out image directly into the still image as a digital watermark, not at the time of printing but at the time of recording the still image.

Figure 11:
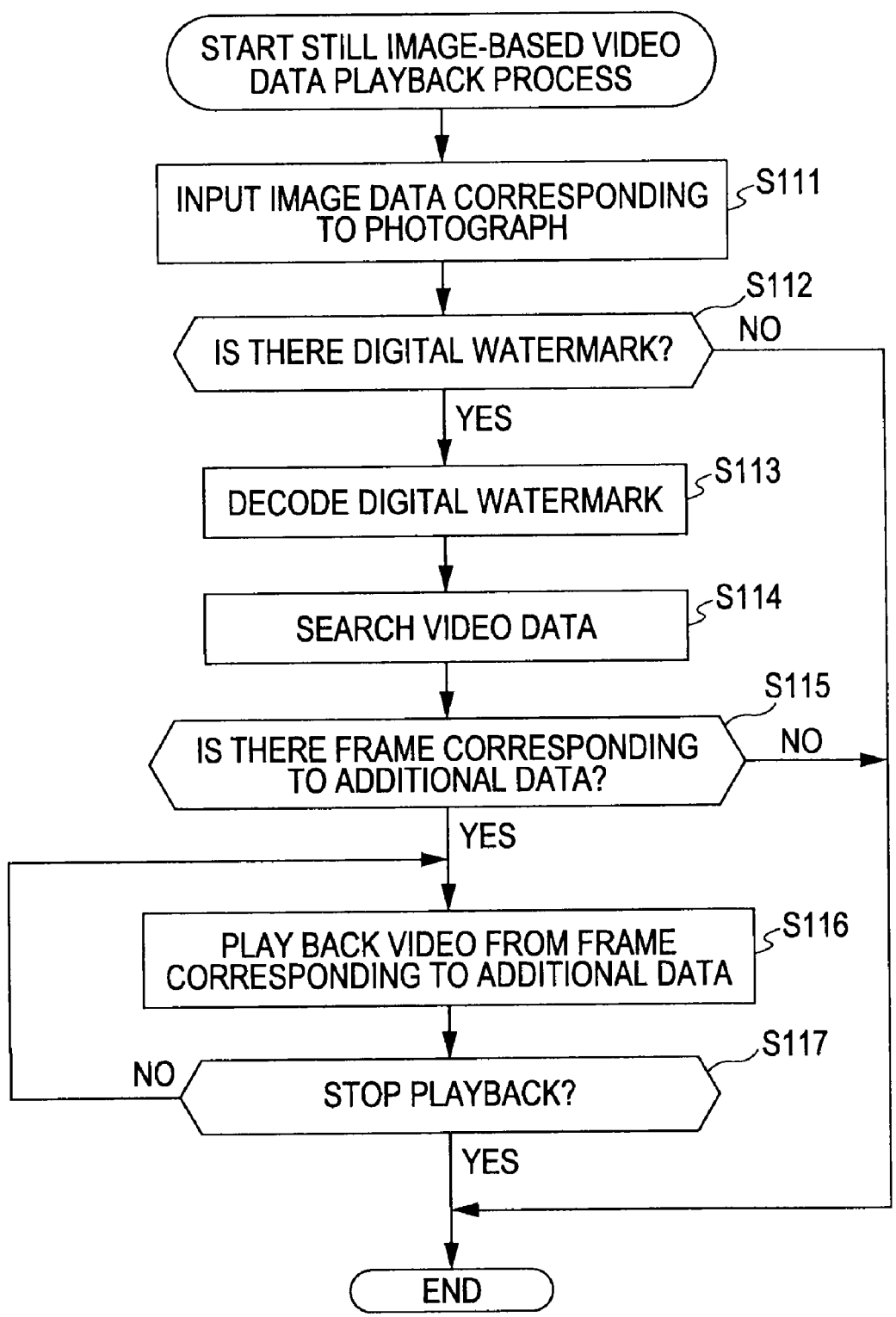
FIG. 11 is a flowchart illustrating a still image-based video data playback process.

Next, referring to the flowchart in FIG. 11, a description will be given of a still image-based video data playback process, which is executed by using the photograph shown in FIG. 9 or FIG. 10. The example of FIG. 11 is directed to the case of using the photograph shown in FIG. 10 on which a still image with an embedded digital watermark is printed.

For example, to view recorded video, the operator connects the video recording/playback apparatus 11 to the television apparatus (not shown) via a HDMI cable, and switches the mode switch (not shown) of the video recording/playback apparatus 11 to the still image-based video playback mode. In response to this operation, a still image-based video playback command is issued from the input unit 24, causing the function mode of the video recording/playback apparatus 11 to switch to the still image-based video playback mode. Then, the processing in FIG. 11 is started.

The operator holds in his/her hand an album containing photographs previously printed in the manner as described above with reference to FIG. 8, and searches the album for a photograph he/she wants to view as video (moving image). If a photograph corresponding to video the operator wants to play back is found, the operator directs the image capturing unit 21 of the video recording/playback apparatus 11 towards the photograph.

In response to this operation, in step S111, the image capturing unit 21 inputs image data corresponding to the photograph serving as a subject. That is, the image capturing unit 21 forms the image of the subject on the image capturing device, and transfers image data accumulated on the image capturing device to the captured data storing unit 22. This image data is transferred to the video signal processing unit 57 via the video data receiving unit 51 and the video data storing unit 52.

In step S112, the video data signal processing unit 57 determines whether or not there is a digital watermark in the image data corresponding to the photograph. In the case of a two-dimensional code, it is determined here whether or not there is a two-dimensional code in the image data corresponding to the photograph.

If it is determined in step S112 that there is a digital watermark in the image data corresponding to the photograph, the video data signal processing unit 57 transfers this image data to the additional data decoding unit 67. In step S113, the additional data decoding unit 67 decodes the digital watermark. Upon decoding the digital watermark, additional data of the still image printed on the photograph (that is, information related to the original cut-out image cut out as the still image, for example, GPS information) is extracted, and the additional data is transferred to the video data reading unit 31.

In step S114, the video data reading unit 31 searches the video data recorded on the video data recording medium 12, and detects a frame corresponding to the additional data embedded as a digital watermark.

For example, a description will be given of a case where additional data is GPS information. The video data reading unit 31 detects chapters embedded in step S14 in FIG. 3 or the like. Then, if, among the chapters, the GPS information of a frame that exists at a chapter position matches the GPS information of the additional data, the video data reading unit 31 detects the frame that exists at the chapter position as a frame corresponding to the additional data.

There are cases where additional data is only one of the date and time information and position information of GPS information, or is simply a chapter number. In the case of a chapter number, a frame that exists at the position of a chapter having the chapter number is detected as a frame corresponding to additional data.

If no chapter is embedded, until a frame corresponding to additional data is detected, the GPS information of all frames is searched through to detect a frame corresponding to additional data.

In step S115, the video data reading unit 31 determines whether or not there is a frame corresponding to additional data, and if it is determined that there is a frame corresponding to additional data, in step S116, the video data reading unit 31 plays back video from the frame corresponding to additional data.

That is, video data recorded on the video data recording medium 12 is read by the video data reading unit 31 from the frame corresponding to additional data, decoded by the video data decoding unit 30, and transferred to the video data signal processing unit 57 via the video data receiving unit 51 and the video data storing unit 52. The decoded video data is transferred by the video data signal processing unit 57 to the external output unit 26 via the video data storing unit 61 and the video data transmitting unit 64, and corresponding video is displayed on the display unit of the television apparatus that is connected via the external output unit 26.

Thus, video can be played back from the frame at the instant a still image selected by the user is cut out, or several seconds before the instant.

The operator presses a playback end button (not shown) of the video recording/playback apparatus 11. In response to this operation, a still image-based video playback end command is issued from the input unit 24.

In step S117, each corresponding unit of the video recording/playback apparatus 11 determines whether or not to end playback of video data, and if, on the basis of the still image-based video playback end command from the input unit 24, it is determined to end playback of video data, the video data playback process is ended.

On the other hand, if a video playback end command is not issued, and it is thus determined in step S117 not to end playback of video data, the processing returns to step S116, and the subsequent processing is repeated.

If it is determined in step S112 that there is no digital watermark in the image data corresponding to the photograph, or if it is determined in step S115 that there is no frame corresponding to the additional data, the still image-based video data playback process is ended.

In this way, by printing a still image as a photograph, the still image can be easily browsed. Then, if it is desired to view video corresponding to the photograph (still image) while browsing the photograph, by capturing the photograph, information related to the original cut-out image which is printed as a digital watermark or a two-dimensional code together with the still image is acquired. On the basis of the information, video data is searched through to locate a corresponding frame, so video can be played back from the located frame.

That is, the user can playback video from a desired position simply by capturing a photograph.

Even if a still image is not printed as a photograph, by selecting a desired still image while browsing still images recorded on the still image data recording medium 13, it is possible to play back video from the position of a frame corresponding to the selected still image.

Next, referring to the flowchart in FIG. 12, another example of a still image-based video playback process will be described. Since steps S134 to S137 in FIG. 12 are basically the same processes as those of steps S114 to S117 in FIG. 11, their detailed description is omitted to avoid repetition.

For example, when a list of still images (thumbnail images) is being displayed in step S72 in FIG. 7 described above, the operator selects one still image, and switches the mode switch (not shown) of the video recording/playback apparatus 11 to the still image-based video playback mode. Alternatively, when a still image is being displayed in step S75 in FIG. 7, the operator switches the mode switch (not shown) of the video recording/playback apparatus 11 to the still image-based video playback mode.

Figure 12:
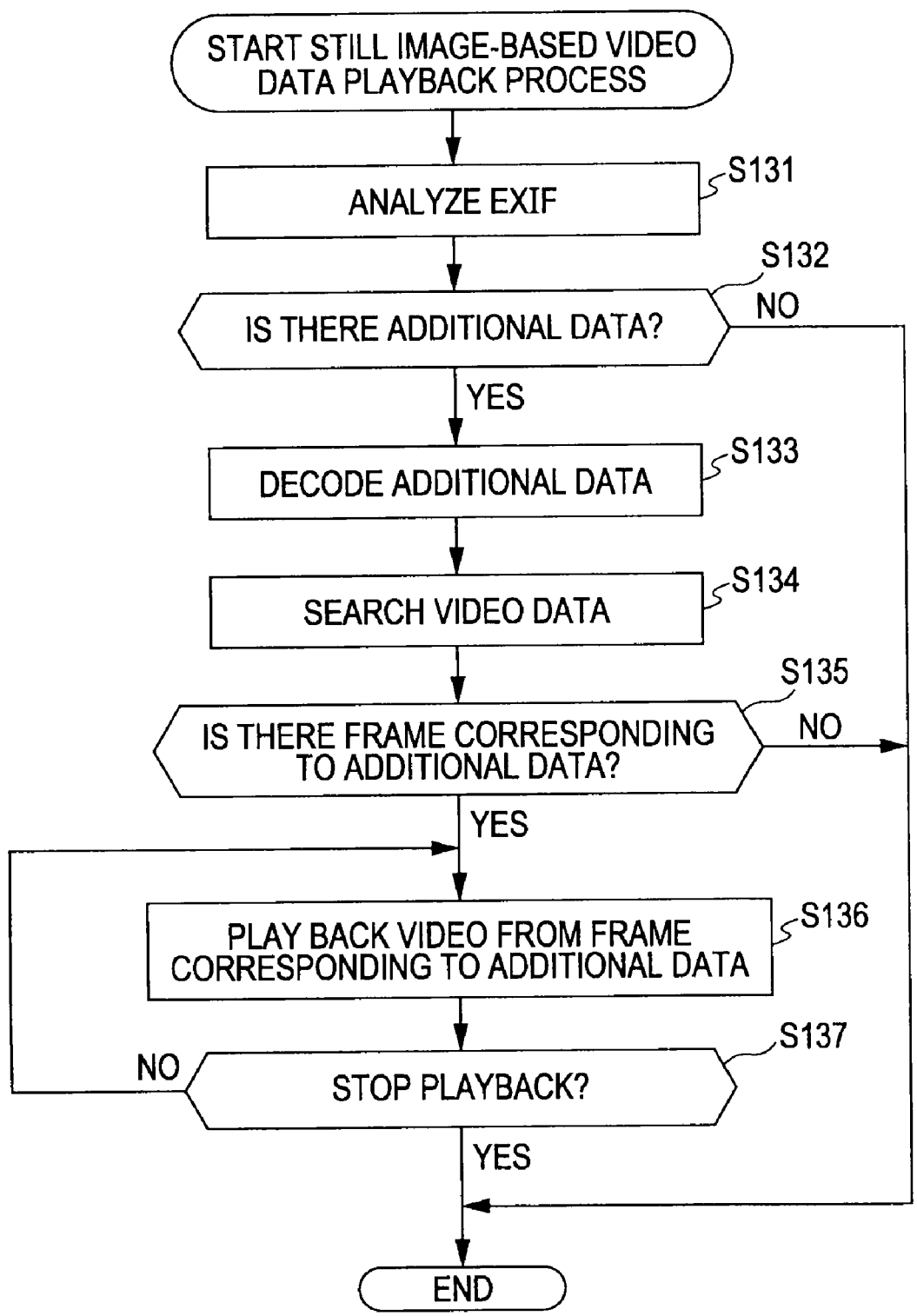
FIG. 12 is a flowchart illustrating another example of a still image-based video data playback process.

In response to this operation, a still image-based video playback command is issued from the input unit 24, causing the function mode of the video recording/playback apparatus 11 to switch to the still image-based video playback mode, and then the processing in FIG. 12 is started. The still image data reading unit 34 transfers the still image data selected from the still image data recording medium 13 to the still image data decoding unit 35.

In step S131, the still data decoding unit 35 analyzes the EXIF of the selected still image data. In step S132, the still image data decoding unit 35 determines whether or not the EXIF data contains additional data indicating information (for example, GPS information) related to the original cut-out image cut out as the still image.

If it is determined in step S132 that the EXIF data contains additional data, the processing proceeds to step S133. In step S133, the still image data decoding unit 35 decodes the additional data. The decoded additional data (that is, information related to the original cut-out video cut out as the still image, for example, GPS information) is transferred to the video data reading unit 31 via the video data control unit 25.

In step S134, the video data reading unit 31 searches the video data recorded on the video data recording medium 12, and detects a frame corresponding to the additional data added to the still image.

In step S135, the video data reading unit 31 determines whether or not there is a frame corresponding to the additional data, and if it is determined that there is a frame corresponding to the additional data, in step S136, the video data reading unit 31 plays back video from the frame corresponding to the additional data.

In step S137, each corresponding unit of the video recording/playback apparatus 11 determines whether or not to end playback of video data, and if, on the basis of a still image-based video playback end command from the input unit 24, it is determined to end playback of video data, the video data playback process is ended.

On the other hand, if a video playback end command is not issued, and it is thus determined in step S137 not to end playback of video data, the processing returns to step S136, and the subsequent processing is repeated.

If it is determined in step S132 that the EXIF data of the still image does not contain additional data, or if it is determined in step S135 that there is no frame corresponding to additional data, the still image-based video data playback process is ended.

In this way, by simply selecting a recorded still image, information related to the original cut-out image is acquired from the still image, and on the basis of the information, video data is searched through to locate a corresponding frame, so video can be played back from the located frame.

That is, the user can playback video from a desired position simply by selecting a still image.

While the above description is directed to the case in which a chapter is embedded at the time of cutting out a still image, alternatively, video data can be split as a file at a position corresponding to the instant of cut-out or several seconds before the instant. In this case, on the basis of additional data added to the still image, a comparison is made against the additional data associated with the video file. As information related to the original cut-out image, not only GPS information but also the name of a split file may be added to the still image.

Further, by preparing a database or the like separately, an index associating video data with still image data is created, and rather than on the video side, information related to the still image itself is printed as a digital watermark or a two-dimensional code. It is also possible to capture the printed still image, decodes the digital watermark or two-dimensional code to read the information related to the still image itself, and retrieve the video data associated with the still image from the database on the basis of the read information.

The above description is directed to the case in which recording is performed on the video recording/playback apparatus 11, and playback is performed on the video recording/playback apparatus 11. However, in a case where, for example, recorded still images are copied onto large capacity disc media and given to friends or the like, a situation is conceivable in which there are a plurality of discs containing the same chapter, position information, date and time information, or the like, in which case confusion may arise over the association between the still images and the video.

In this case, data indicating equipment that has performed recording, or IDs that are independent among pieces of equipment are added to still images together with information related to their original cut-out images. This makes it possible to maintain the association between the still images and the video. It should be noted that in a case where singular, unique information such as the GPS information described above is used as information related to the original cut-out image, it is not necessary to add data indicating devices that have performed recording, or the like.

Further, the above description is directed to a closed case within a single piece of equipment, in which video and each still image captured by a single video recording/playback apparatus 11 are associated with each other, information related to video data is printed on the photograph of a printed still image, and the information is read to thereby search through video within the video recording/playback apparatus 11. Next, a description will be given of a case in which video within the video recording/playback apparatus 11 is recorded onto an optical disc such as a Blu-ray Disc.

Figure 13:
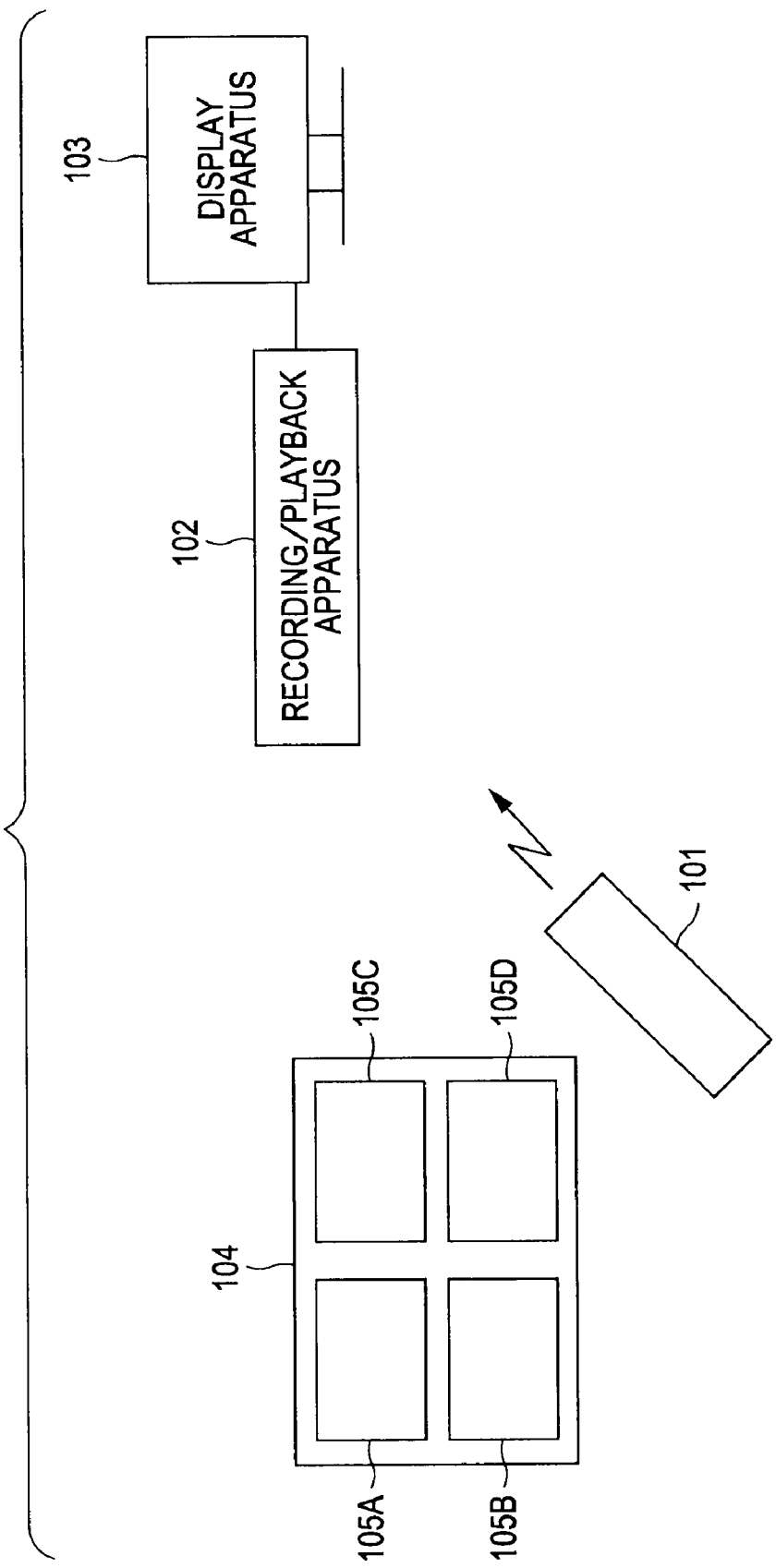
FIG. 13 is a diagram showing a configuration example of a video display system according to another embodiment of the present invention.

FIG. 13 is a diagram showing a configuration example of a video display system according to another embodiment of the present invention.

The video display system shown in FIG. 13 includes a remote controller 101, a recording/playback apparatus 102, and a display apparatus 103. On an album 104, photographs 105A to 105D are pasted in a manner allowing browsing. On each of these photographs, a still image recorded with the video recording/playback apparatus 11 in FIG. 1, and GPS information in the form of a digital watermark or the like serving as information related to the original cut-out image, are printed.

The remote controller 101 transmits radio waves corresponding to a user's operation signal toward the recording/playback apparatus 101. In addition, the remote controller 101 includes an image capturing unit 171 (FIG. 16) for reading digital watermarks in the photographs 105A to 105D. The remote controller 101 captures a desired photograph, detects its digital watermark, and decodes the digital watermark to obtain GPS information. The remote controller 101 transmits radio waves corresponding to GPS information obtained from a desired photograph (for example, the photograph 105A) among the photographs 105A to 105D, toward the recording/playback apparatus 102.

The recording/playback apparatus 102 records video data captured and recorded by the video recording/playback apparatus 11 in FIG. 1 (not shown), onto a video data recording medium 111 (FIG. 14) such as a Blu-ray Disc. At that time, GPS information, a chapter, and the like added to the video data are also recorded by using BD-J (Blu-ray Disc Java®) or the like.

By receiving the radio waves from the remote controller 101, the recording/playback apparatus 102 acquires GPS information obtained from the photograph 105A. The recording/playback apparatus 102 searches through the video data captured and recorded by the video recording/playback apparatus 11, which is recorded on the video data recording medium 111, to locate a frame having GPS information that matches the acquired GPS information, plays back video from the located frame, and displays the played back video on the display apparatus 103.

Like the video recording/playback apparatus 11 in FIG. 1, the recording/playback apparatus 102 also makes it possible to record, browse, and print a still image during recording or playback of video data. That is, the recording/playback apparatus 102 differs only in the absence of an image capturing function and a GPS function, and the recording/playback apparatus 102 is otherwise of the same configuration as the video recording/playback apparatus shown in FIG. 1.

The display apparatus 103 is configured by, for example, a television receiver or the like, and displays video from the connected recording/playback apparatus 102.

In this way, by simply looking at the photographs 105A to 105D pasted on the album 104, and capturing (inputting) a desired photograph with the remote controller 101, the user can perform video playback from the same position as that of the photograph, on the recording/playback apparatus 102.

While the example of FIG. 13 is directed to the case where video data captured and recorded by the video recording/playback apparatus 11 is recorded onto the video data recording medium 111 by the recording/playback apparatus 102, video data can of course be played back similarly by also inserting the video data recording medium 12 on which video data captured by the video recording/playback apparatus 11 has already been recorded, into the recording/playback apparatus 102.

Figure 14:
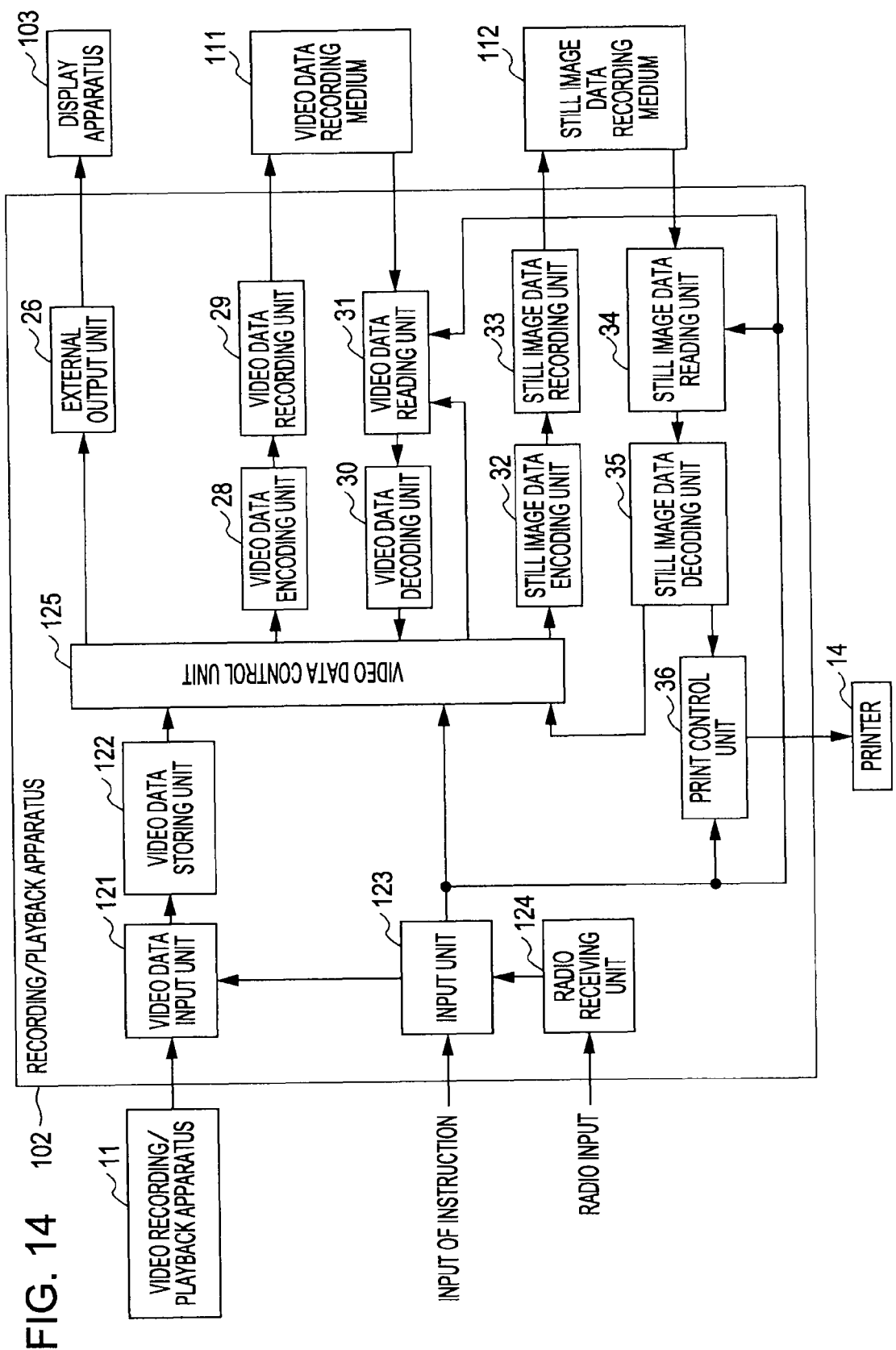
FIG. 14 is a block diagram showing a configuration example of a recording/playback apparatus.

FIG. 14 is a diagram showing a detailed configuration example of the recording/playback apparatus 102 shown in FIG. 13. The video data recording medium 111, a still image data recording medium 112, and the like can be inserted into and removed from the recording/playback apparatus 102. As necessary, the printer 14 is connected to the recording/playback apparatus 102.

The recording/playback apparatus 102 shown in FIG. 14 differs from the video recording/playback apparatus 11 shown in FIG. 1 in the following points: the image capturing unit 21, the captured data storing unit 22, and the GPS information acquiring unit 23 are removed; an input unit 123 and a video data control unit 125 are respectively added instead of the input unit 24 and the video data control unit 25; and a video data input unit 121, a video data storing unit 122, and a radio receiving unit 124 are added.

The recording/playback apparatus 102 is common to the video recording/playback apparatus 11 shown in FIG. 1 in that the recording/playback apparatus 102 includes the external output unit 26, the display unit 27, the video data encoding unit 28, the video data recording unit 29, the video data decoding unit 30, the video data reading unit 31, the still image data encoding unit 32, the still image data recording unit 33, the still image data reading unit 34, the still image data decoding unit 35, and the print control unit 36. The display apparatus 103 is connected to the external output unit 26 shown in FIG. 14.

That is, the video data input unit 121 receives an input of, for example, video data with added GPS information which is captured and recorded by the connected video recording/playback apparatus 11, and transfers the video data to the video data storing unit 122. The video data storing unit 122 is configured by, for example, a semiconductor memory, and temporarily stores multiple images' (multiple frames') worth of image data inputted from the video data input unit 121.

Upon receiving an instruction input from the operator, or instructions from the radio receiving unit 124, the input unit 123 decodes the accepted instructions, and transfers various kinds of command or information to the corresponding video data control unit 125, video data reading unit 31, still image data reading unit 34, or print control unit 36.

The radio receiving unit 124 receives radio waves from the remote controller 101, and transfers instructions or information corresponding to the radio waves to the input unit 123.

The video data control unit 125 performs predetermined image processing on video data transferred from the video data storing unit 122, video data transferred from the video data decoding unit 30, or still image data transferred from the still image data decoding unit 35, and then transfers the resulting data to the external output unit 26 or the display unit 27.

When a video recording command is received from the input unit 123, the video data control unit 125 performs predetermined image processing on video data from the video data storing unit 122, and then transfers the resulting data to the video data encoding unit 28. When a video recording end command is received from the input unit 123, the video data control unit 125 ends the transfer of video data to the video data encoding unit 28.

When a still image cut-out command is received from the input unit 123, the video data control unit 125 acquires a still image from video data. That is, the video data control unit 125 cuts out the image at the instant the still image cut-out command is received, from the video data. In addition, the video data control unit 125 transmits image-related information for identifying the (original cut-out) image cut out as a still image, to the still image data encoding unit 32.

Figure 15:
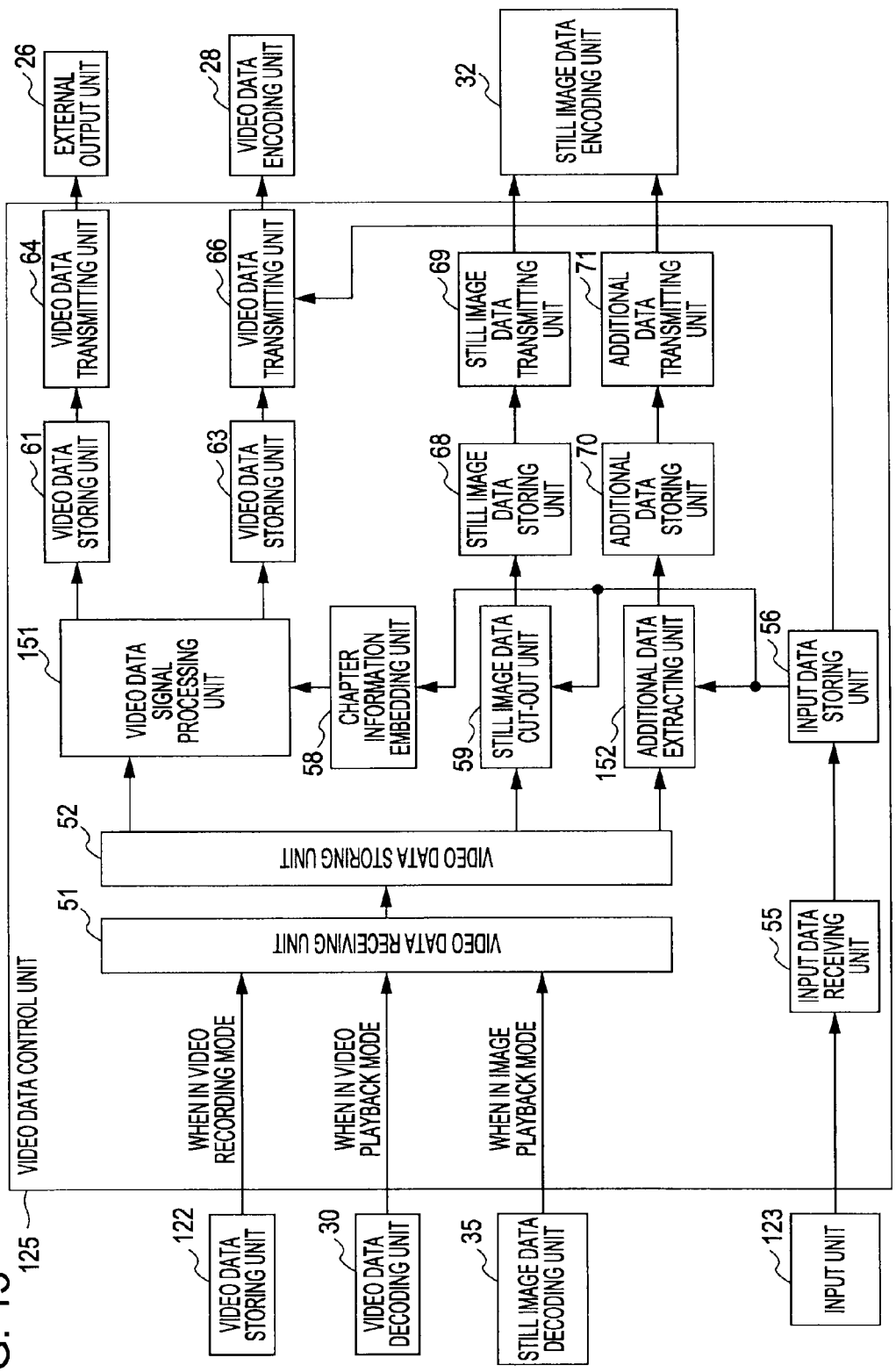
FIG. 15 is a block diagram showing a detailed configuration example of a video data control unit.

FIG. 15 shows a detailed configuration example of the video data control unit 125 shown in FIG. 14.

The video data control unit 125 shown in FIG. 15 differs from the video data control unit 25 shown in FIG. 2 in that a video data signal processing unit 151 and an additional data extracting unit 152 are respectively added instead of the video data signal processing unit 57 and the additional data extracting unit 60, and that the GPS data receiving unit 53, the GPS data storing unit 54, and the additional data decoding unit 67 are removed.

In addition, the video data control unit 125 shown in FIG. 15 is common to the video data control unit 25 shown in FIG. 2 in that the video data control unit 125 includes the video data receiving unit 51, the video data storing unit 52, the input data receiving unit 55, the input data storing unit 56, the chapter information embedding unit 58, the still image data cut-out unit 59, the video data storing units 61 to 63, the video data transmitting units 64 to 66, the still image data storing unit 68, the still image data transmitting unit 69, the additional data storing unit 70, and the additional data transmitting unit 71.

That is, the video data signal processing unit 151 performs predetermined image signal processing corresponding to the data output destination, such as resolution conversion or correction, on video data from the video data storing unit 52, and transfers the resulting data to the corresponding video data storing units 61 to 63. In addition, when a chapter embedding command is received from the chapter information embedding unit 58, the video data signal processing unit 57 embeds a chapter into the video at a designated timing.

When a still image cut-out command is received from the input data storing unit 56, the additional data extracting unit 152 receives, from the video data storing unit 52, the GPS information at or several seconds before the instant the still image cut-out command is received, as data to be added to still image data (image-related information for identifying the original cut-out image cut out as the still image).

Figure 16:
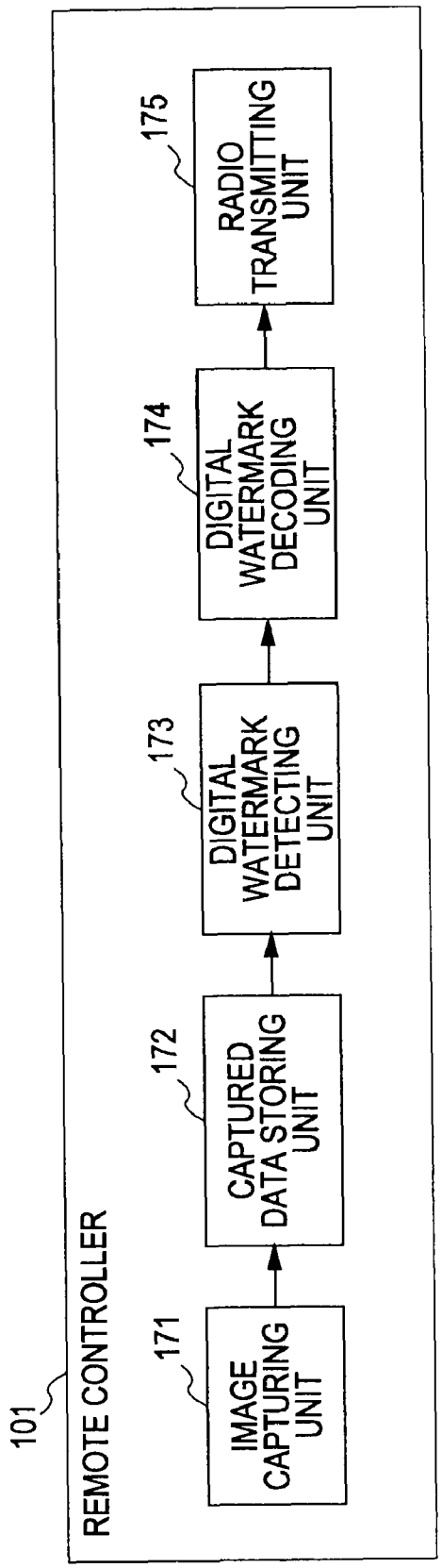
FIG. 16 is a block diagram showing a configuration example of a remote controller.

FIG. 16 shows a configuration example of a part of the remote controller 101 shown in FIG. 13. In FIG. 16, illustration of an operating unit or the like configured by operating buttons or the like is omitted.

The remote controller 101 shown in FIG. 16 includes an image capturing unit 171, a captured data storing unit 172, a digital watermark detecting unit 173, a digital watermark decoding unit 174, and a radio transmitting unit 175.

The image capturing unit 171 forms an image of a subject on a built-in image capturing device such as a CCD or CMOS sensor, and transfers image data accumulated on the image capturing device to the captured data storing unit 172. The captured data storing unit 172 is configured by, for example, a semiconductor memory, and temporarily stores the image data inputted from the image capturing unit 171.

If the image data from the captured data storing unit 172 contains a digital watermark, the digital watermark detecting unit 173 detects the digital watermark. The digital watermark decoding unit 174 decodes the digital watermark contained in video data from the digital watermark detecting unit 173. Thus, from video data obtained by printing a still image and capturing the print (photograph) by the image capturing unit 171, information related to the original cut-out image cut out as the still image is acquired.

The radio transmitting unit 175 transmits radio waves corresponding to the information (for example, GPS information) related to the original cut-out image cut out as the still image decoded by the digital watermark decoding unit 174.

While the example of FIG. 16 is directed to the case of a digital watermark, a two-dimensional code such as a QR code or a cyber code is processed similarly.

Next, referring to the flowchart in FIG. 3 described above again, a video data recording process in the recording/playback apparatus 102 will be described. Since this process is basically the same as the above-described video data recording process in the video recording/playback apparatus 11, a detailed description thereof is omitted.

For example, the operator connects the video recording/playback apparatus 11 shown in FIG. 1 by wire connection such as the USB (Universal Serial Bus), or wireless connection such as the UWB (Ultra Wide Band), plays back video on the video recording/playback apparatus 11, and then presses a recording start button (not shown) of the recording/playback apparatus 102. In response to this operation, a video recording command is issued from the input unit 123, causing the function mode of the recording/playback apparatus 102 to switch to the video recording mode. Then, the processing in FIG. 3 is started.

On the basis of the video recording command from the input unit 123, in step S11, each corresponding unit of the recording/playback apparatus 102 records video data from the video data input unit 121 onto the video data recording medium 111.

That is, video data that has been inputted by the video data inputting unit 121 and stored in the video data storing unit 122 is received by the video data receiving unit 151, and transferred to the video data signal processing unit 151 via the video data storing unit 52. This video data is further transferred to the video data encoding unit 28 via the video data storing unit 63 and the video data transmitting unit 66, encoded by the video data encoding unit 28, transferred to the video data recording unit 29, and recorded onto the video data recording medium 111. At this time, GPS information has been already added to the video data.

The operator presses a recording end button (not shown) of the recording/playback apparatus 102. In response to this operation, a video recording end command is issued from the input unit 123.

In step S12, each corresponding unit of the recording/playback apparatus 102 determines whether or not to end recording of video data, and if, on the basis of a video recording end command from the input unit 123, it is determined to end recording of video data, the video data recording process is ended.

On the other hand, if a video recording end command is not issued, and it is thus determined in step S12 not to end recording of video data, the processing proceeds to step S13, and it is determined whether or not to perform recording of a still image. If a still image cut-out command is not issued, and it is thus determined in step S13 not to perform recording of a still image, the processing returns to step S11, and the subsequent processing is repeated.

When the operator finds a scene he/she likes during recording, to shoot the scene as a still image, the operator presses a still image acquisition shutter button (not shown) of the recording/playback apparatus 102. This still image acquisition shutter button may be provided in the remote controller 101 as well. In response to this operation, a still image cut-out command is issued from the input unit 123.

The still image cut-out command from the input unit 123 is transferred to the chapter information embedding unit 58, the still image data cut-out unit 59, and the additional data extracting unit 152, via the input data receiving unit 55 and the input data storing unit 56.

If it is determined in step S13 to perform recording of a still image, the processing proceeds to step S14. In step S14, the chapter information embedding unit 58 embeds a chapter into the video data at or several seconds before the instant the still image cut-out command is issued.

Specifically, the chapter information embedding unit 58 transmits a chapter embedding command to the video data signal processing unit 151 so as to embed a chapter into the video data at the instant the still image cut-out command is received, or several seconds before the instant. Upon receiving the chapter embedding command from the chapter information embedding unit 58 in response to this operation, the video data signal processing unit 151 embeds the chapter into the video at the designated timing.

In step S15, the still image data cut-out unit 59 cuts out one frame of video signal at the instant the still image cut-out command is received, as a still image. The still image data thus cut out is transferred to the still image data encoding unit 32 via the still image data storing unit 68 and the still image data transmitting unit 69.

In step S16, the additional data extracting unit 152 acquires information related to the original cut-out image cut out as the still image in step S15. That is, the additional data extracting unit 152 acquires, from the video data storing unit 52, the GPS information at or several seconds before the instant the still image cut-out command is received, as data to be added to still image data (information related to the original cut-out image cut out as the still image). When GPS information is not added to video data, time information added to the video data is acquired. Alternatively, as described above with reference to FIG. 5, this may also be a chapter number that can be issued at the time of issuing a chapter embedding command.

The acquired GPS information is transferred to the still image data encoding unit 32 via the additional data storing unit 70 and the additional data transmitting unit 71.

In step S17, the still image data encoding unit 32 converts the GPS information into the EXIF format, adds the converted GPS information to the still image data, and records the still image data with added GPS information onto the still image data recording medium 112. Thereafter, the processing returns to step S11, and the subsequent processing is repeated.

Next, referring to the flowchart in FIG. 11 described above again, a still image-based video playback process in the recording/playback apparatus 102 will be described. Since this process is basically the same as the above-described still image-based video playback process in the video recording/playback apparatus 11, a detailed description thereof is omitted.

For example, to view recorded video, the operator connects the recording/playback apparatus 102 to the display apparatus 103 via a HDMI cable, and switches a mode switch (not shown) of the recording/playback apparatus 102 to the still image-based video playback mode. In response to this operation, a still image-based video playback command is issued from the input unit 123, causing the function mode of the recording/playback apparatus 102 to switch to the still image-based video playback mode. Then, the processing in FIG. 11 is started.

The operator holds in his/her hand an album containing photographs previously printed in the manner as described above with reference to FIG. 8, and searches through the photographs 105A to 105D for a photograph he/she wants to view as video (moving image). If the photograph 105B corresponding to desired video to be played back is found, the operator directs the image capturing unit 171 of the remote controller 101 towards the photograph 105B.

In response to this operation, in step S111, the image capturing unit 171 inputs image data corresponding to the photograph serving as a subject. That is, the image capturing unit 171 forms the image of the subject on the image capturing device, and transfers image data accumulated on the image capturing device to the captured data storing unit 172. The captured data storing unit 172 transfers the image data to the digital watermark detecting unit 173.

In step S112, the digital watermark detecting unit 173 determines whether or not there is a digital watermark in the image data corresponding to the photograph. In the case of a two-dimensional code, it is determined here whether or not there is a two-dimensional code in the image data corresponding to the photograph.

If it is determined in step S112 that there is a digital watermark in the image data corresponding to the photograph, the digital watermark detecting unit 173 transfers this image data to the digital watermark decoding unit 174. In step S113, the digital watermark decoding unit 174 decodes the digital watermark. Upon decoding the digital watermark, additional data of the still image printed on the photograph (that is, information related to the original cut-out video cut out as the still image, for example, GPS information) is extracted, and the additional data is transferred to the radio transmitting unit 175. The radio transmitting unit 175 converts the additional data of the still image into radio waves for transmission toward the recording/playback apparatus 102.

The radio receiving unit 124 of the recording/playback apparatus 102 issues to the input unit 123 an instruction to search for a frame corresponding to the additional data of the still image. In response to this operation, the input unit 123 issues a frame search command to the video data reading unit 31.

In step S114, the video data reading unit 31 searches through video data recorded on the video data recording medium 111, and detects a frame corresponding to the additional data embedded as a digital watermark.

In step S115, the video data reading unit 31 determines whether or not there is a frame corresponding to additional data, and if it is determined that there is a frame corresponding to additional data, in step S116, the video data reading unit 31 plays back video from the frame corresponding to additional data.

That is, video data recorded on the video data recording medium 111 is read by the video data reading unit 31 from the frame corresponding to additional data, decoded by the video data decoding unit 30, and transferred to the video data signal processing unit 151 via the video data receiving unit 51 and the video data storing unit 52. The decoded video data is transferred by the video data signal processing unit 151 to the external output unit 26 via the video data storing unit 61 and the video data transmitting unit 64. Thus, corresponding video is displayed on the display unit of the display apparatus 103 that is connected via the external output unit 26.

The operator presses a playback end button (not shown) of the recording/playback apparatus 102. In response to this operation, a still image-based video playback end command is issued from the input unit 123.

In step S117, each corresponding unit of the recording/playback apparatus 102 determines whether or not to end playback of video data, and if, on the basis of the still image-based video playback end command from the input unit 123, it is determined to end playback of video data, the video data playback process is ended.

On the other hand, if a video playback end command is not issued, and it is thus determined in step S117 not to end playback of video data, the processing returns to step S116, and the subsequent processing is repeated.

If it is determined in step S112 that there is no digital watermark in the image data corresponding to the photograph, or if it is determined in step S115 that there is no frame corresponding to the additional data, the still image-based video data playback process is ended.

Since other processes in the recording/playback apparatus 102 are respectively basically the same as the video data playback process in the video recording/playback apparatus 11 described above with reference to FIG. 5, the chapter embedding process during standby in the video recording/playback apparatus 11 described above with reference to FIG. 6, the still image data playback process in the video recording/playback apparatus 11 described above with reference to FIG. 7, the still image printing process in the video recording/playback apparatus 11 described above with reference to FIG. 8, and the still image-based video playback process in the video recording/playback apparatus 11 described above with reference to FIG. 12, a description thereof is omitted.

In this way, by simply capturing the photograph of a still image with an embedded digital watermark or two-dimensional code by the remote controller 101, and transmitting data with the digital watermark or the like decoded, video can be played back from a desired position.

For example, video of the grandchild's sports day event is recorded on an optical disc in the manner as described above again with reference to FIG. 3, without editing. At the same time, still images are recorded, and photographs are printed in the manner as described above with reference to FIG. 8, and an album binding the photographs and the optical disc are given to grandparents as a present. Even if the grandparents are not very good at mechanics, the video can be played back and watched from a desired position by a simple operation of inserting the optical disc into the recording/playback apparatus 102, and upon finding a photograph they like while looking at the album, reading the photograph by the image capturing unit 171 of the remote controller 101.

It should be noted that in the video display system shown in FIG. 13, the remote controller 101 dedicated to the recording/playback apparatus 102 is equipped with the image capturing unit 171 that serves as a digital watermark reader. Therefore, by reading a digital watermark embedded in a still image with the remote controller 101, and transmitting the digital watermark to the recording/playback apparatus 102, video is played back from a desired position on the recording/playback apparatus 102. However, depending on the case, the remote controller 101 does not include the image capturing unit 171. In this case, it is also possible to cause a mobile telephone with image capture function to perform steps S111 to S113 shown in FIG. 11, and transmit decoded information of additional data to the recording/playback apparatus 102 via a wireless LAN (Local Area Network) or infrared communication.

The above description is directed to the case of the video recording/playback apparatus 11 shown in FIG. 1 such as a camcorder, and the case of the video display system shown in FIG. 13 which records onto and plays back from an optical disc. However, the present invention can further be applied to the case of sending video to a moving image sharing service such as a media server, and retrieving the video.

Specifically, when transmitting video data to a media server or the like, it is possible to transmit the video data in a state with additional information such as GPS information added to the video data, and search for all the frames with the same additional data as the additional data printed on a photograph together with a still image, or use the additional data for the directory structure when recording to the media server or the URL (uniform Resource Locator) uploaded to the moving image sharing site.

For example, in the case of recording video data having additional data "Jan. 1, 1999, 12:31 at latitude 37°00', longitude 137°12'4" to a media server, the video data is recorded to a directory "/HOME/01/01/1999/12/31/37/00/137/124". Alternatively, when uploading the video data to a moving image sharing site, the corresponding URL is set as "http://kyouyuu.co.jp/HOME/01_01_1999_12_31_37_00_137_124" or the like. Thus, video can be easily retrieved from a moving image sharing service such as a media server.

In this way, upon cutting out a still image from video data, information related to the original cut-out image cut out as the still image is added to the still image, thereby making it possible to find desired video from an enormous collection of recorded videos.

That is, in recent years, the HDD (Hard Disk Drive) capacity of compact video cameras is increasing, making it possible to shoot high-quality moving images for a long time or to shoot a large number of still images.

In addition, video cameras are increasingly equipped with a function with which even during shooting of a moving image, when wishing to save this scene also as a photograph, a still image is also saved by pressing a shutter button while shooting the moving image, or a function with which when, after a moving image is shot, it is desired to save this scene while browsing the moving image at a later date, the scene is saved by pressing a shutter button.

In coming years, it is expected that video cameras will become increasingly smaller in size and larger in capacity, and moving images with longer durations and a greater number of still images will be stored in video cameras. In this regard, it is necessary to organize and search through long-duration moving images and a large number of still images which have been shot and recorded.

Generally, a still image only cuts out a specific instant in time. Thus, even a person who was not present in the location of shoot can browse still images relatively quickly at his/her own pace, has a desired photograph printed on a printer, paste the photograph to an album for easy organization.

However, browsing a moving image takes as much time as shooting the moving image. Also, a moving image contains many unimportant parts. Therefore, it is particularly difficult for a person who was not present in the location of shoot to find which scene is an important part. It is thus necessary to edit the moving image for easy viewing by the video shooter or a person who accompanied the video shooter to the location of shoot. However, this editing is a difficult and cumbersome task, often resulting in situations where a moving image has been shot but ends up not being watched.

Since a moving image provides more information than a still image by way of sounds in the surroundings and movements of a shooting object, it is a waste to shoot a moving image but not watch the moving image. In recent years, a type of personal computer software exists which automatically edits points in a video by exploiting a technique such as face recognition. However, using such software can be a challenge for those who are not good at operating a personal computer or digital equipment. In addition, for example, in the case of showing the moving images of the grandchild's sports day event to a person who could not attend the event, one may wish the person to watch not only edited moving images but all the moving images taken as images he/she wants to watch.

As described above, according to an embodiment of the present invention, information related to the video of a scene of interest, that is, additional data for making a random access to the scene, is added to a still image recorded during video shooting or playback.

Parts to be recorded (saved) as still images are those points which the user particularly wants to save to remember, and hence are highly important scenes. By simply printing such still images and binding the prints to an album or the like, indexing for video playback can be achieved. The user may simply browse the album, select a desired still image, and shoot the still image to acquire information related to the original cut-out image cut out as the still image, which is embedded in the form of a digital watermark or the like, from the still image, thereby making it possible to play back the video of the corresponding scene.

As described above, according to an embodiment of the present invention, even a person who is poor at operating a personal computer or digital equipment can locate a desired point for playback from an enormous collection of videos, by the same simple operation of selecting a photograph from an album as before.

The series of processes described above can be executed by hardware, or can be executed by software. If the series of processes is to be executed by software, a program constituting the software is installed from a program-recording medium into a computer embedded in dedicated hardware, or a general purpose personal computer or the like that can execute various kinds of function when installed with various kinds of program.

Figure 17:
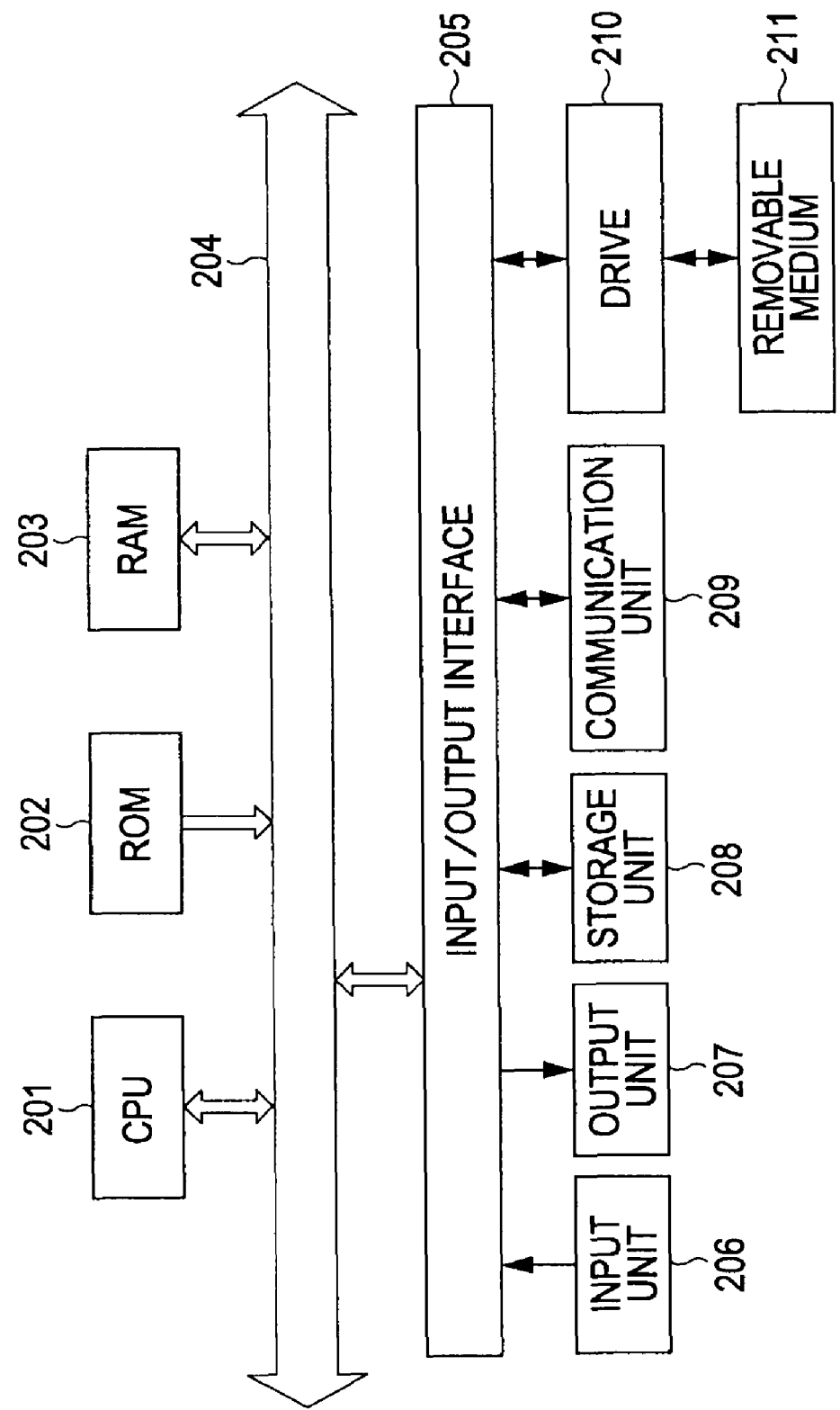
FIG. 17 is a block diagram showing an example of hardware configuration of a computer.

FIG. 17 is a block diagram showing an example of hardware configuration of a computer that executes the above-described series of processes by a program.

A CPU (Central Processing Unit) 201, a ROM (Read Only Memory) 202, and a RAM (Random Access Memory) 203 are connected to each other via a bus 204.

An input/output interface 205 is further connected to the bus 204. Connected to the input/output interface 205 are an input unit 206 configured by a keyboard, a mouse, or a microphone, an output unit 207 configured by a display, a speaker, or the like, a storage unit 208 configured by a hard disk, a non-volatile memory, or the like, a communication unit 209 configured by a network interface or the like, and a drive 210 that drives a removable medium 211 such as an optical disc or a semiconductor memory.

In the computer configured as described above, the above-described series of processes is performed by, for example, the CPU 201 loading a program stored in the storage unit 208 into the RAM 203 via the input/output interface 205 and the bus 204, and executing the loaded program.

The program executed by the CPU 201 is provided by being recorded on the removable medium 211, for example, or via a wire or wireless transmission medium such as a local area network, Internet, or digital broadcasting, and installed into the storage unit 208.

The program executed by the computer may be a program in which processes are performed time sequentially in the order as described in this specification, or may be a program in which processes are executed in parallel, or at necessary timing such as when called.

Further, the term system as used in this specification refers to the entire apparatus formed by a plurality of pieces of apparatus.

The present application contains subject matter related to that disclosed in Japanese Priority Patent Application JP 2008-193457 filed in the Japan Patent Office on Jul. 28, 2008, the entire content of which is hereby incorporated by reference.

Embodiments of the present invention are not limited to the above-described embodiments, but various modifications are possible without departing from the scope of the present invention.

What is claimed is:

1. A recording apparatus comprising:
 moving image recording means for recording a moving image in a moving image recording mode;
 still image acquiring means for acquiring a still image from the moving image during recording or playback of the moving image;
 GPS information acquiring means for acquiring GPS information from a GPS (Global Positioning System);
 information adding means for adding the GPS information at or slightly before the time the still image is acquired by the still image acquiring means, to the still image acquired by the still image acquiring means;
 still image recording means for recording the still image to which the GPS information has been added by the information adding means; and
 moving image playback means for performing playback from the moving image at or slightly before the time the still image is acquired by the still image acquiring means, on the basis of the GPS information, when the still image to which the GPS information has been added by the information adding means is selected.

2. The recording apparatus according to claim 1, further comprising:
 image capturing means for capturing the GPS information which is printed together with the still image, wherein the moving image playback means performs playback from the moving image at or slightly before the time the still image is acquired by the still image capturing means, on the basis of the GPS information which is captured by the image capturing means.

3. The recording apparatus according to claim 2, further comprising:
 separator information embedding means for embedding separator information into the moving image at or slightly before the time the still image is acquired by the still image acquiring means,
 wherein the moving image playback means performs playback from the moving image at or slightly before the time the still image is acquired by the still image acquiring means, on the basis of the GPS information which is captured by the image capturing means and the separator information embedded into the moving image by the separator information embedding means.

4. The recording apparatus according to claim 2, wherein the GPS information is printed as a two-dimensional code, together with the still image.

5. The recording apparatus according to claim 2, wherein the GPS information is printed as a digital watermark, together with the still image.

6. The recording apparatus according to claim 1, further comprising:
 separator information embedding means for embedding separator information into the moving image at or slightly before the time the still image is acquired by the still image acquiring means.

7. The recording apparatus according to claim 6, wherein the GPS information is information related to a position of the separator information embedded into the moving image by the separator information embedding means.

8. A recording method comprising:
 recording a moving image in a moving image recording mode;
 acquiring a still image from the moving image during recording or playback of the moving image;
 acquiring GPS information from a GPS (Global Positioning System);
 adding the GPS information at or slightly before the time the still image is acquired, to the still image;
 recording the still image to which the GPS information has been added; and
 performing playback from the moving image at or slightly before the time the still image is acquired on the basis of the GPS information, when the still image to which the GPS information has been added is selected.

9. A non-transitory computer-readable medium including computer program instructions, which when executed by a computer, cause the computer to execute processing comprising:
 recording a moving image in a moving image recording mode;
 acquiring a still image from the moving image during recording or playback of the moving image;
 acquiring GPS information from a GPS (Global Positioning System);
 adding the GPS information at or slightly before the time the still image is acquired, to the still image;
 recording the still image to which the GPS information has been added; and
 performing playback from the moving image at or slightly before the time the still image is acquired on the basis of the GPS information, when the still image to which the GPS information has been added is selected.

10. A recording apparatus comprising:

a moving image recording unit configured to record a moving image in a moving image recording mode;

a still image acquiring unit configured to acquire a still image from the moving image during recording or playback of the moving image;

a GPS information acquiring unit configured to acquire GPS information from a GPS (Global Positioning System);

an information adding unit configured to add the GPS information at or slightly before the time the still image is acquired by the still image acquiring unit, to the still image acquired by the still image acquiring unit;

a still image recording unit configured to record the still image to which the GPS information has been added by the information adding unit; and a moving image playback unit configured to perform playback from the moving image at or slightly before the time the still image is acquired by the still image acquiring unit, on the basis of the GPS information, when the still image to which the GPS information has been added by the information adding unit is selected.

* * * * *